US010721147B2

(12) United States Patent
Buscemi et al.

(10) Patent No.: US 10,721,147 B2
(45) Date of Patent: Jul. 21, 2020

(54) METHODS AND APPARATUS FOR ASSOCIATING CONTENT WITH ONE OR MORE WIRELESS SIGNALS AND/OR CONTROLLING ACCESS TO CONTENT ASSOCIATED WITH SUCH SIGNALS

(71) Applicant: CECELUMEN, LLC, Camarillo, CA (US)

(72) Inventors: James S. Buscemi, Camarillo, CA (US); Jim Webster, Manhattan Beach, CA (US)

(73) Assignee: CECELUMEN, LLC, Camarillo, CA (US)

(*) Notice: Subject to any disclaimer, the term of this patent is extended or adjusted under 35 U.S.C. 154(b) by 114 days.

(21) Appl. No.: 15/344,477

(22) Filed: Nov. 4, 2016

(65) Prior Publication Data

US 2017/0134250 A1 May 11, 2017

Related U.S. Application Data

(63) Continuation-in-part of application No. 15/062,175, filed on Mar. 6, 2016.
(Continued)

(51) Int. Cl.
H04L 9/00 (2006.01)
H04W 52/02 (2009.01)
H04L 12/26 (2006.01)

(52) U.S. Cl.
CPC ......... *H04L 43/08* (2013.01); *H04W 52/0225* (2013.01); *Y02D 70/00* (2018.01);
(Continued)

(58) Field of Classification Search
None
See application file for complete search history.

(56) References Cited

U.S. PATENT DOCUMENTS 9,898,912 B1 2/2018 Jordan, II
2006/0019679 A1 1/2006 Rappaport et al.
(Continued)

OTHER PUBLICATIONS

Notification of Transmittal of the International Search Report and the Written Opinion of the International Searching Authority or the Declaration, International Search Report and Written Opinion of the International Searching Authority from PCT/US2016/060723, dated May 11, 2017 1-6 pages.

*Primary Examiner* — John Olszewski
*Assistant Examiner* — Gerrad A Foster
(74) *Attorney, Agent, or Firm* — Straub & Straub; Michael P. Straub; Stephen T. Straub

(57) ABSTRACT

Methods and apparatus for associating content with wireless signals, e.g., beacon signals, and for controlling the ability to access or alter content provided in response to an indication that one or more wireless signals have been received are described. In some embodiments a beacon transmitter is placed in a product such as a teddy bear, story book, toy, piece of jewelry, etc. Devices in the range of the wireless transmitter detect the signal and report the receipt of the signal to a registry device. The registry device takes into consideration which wireless signal or signals were reported as being received in a given time period, the identity of the device reporting the receipt of the signal, the time period in which the wireless signal was received, and/or other factors. Based on one or more rules the registry device determines which content, if any, to supply to the device.

20 Claims, 15 Drawing Sheets

Related U.S. Application Data

(60) Provisional application No. 62/251,678, filed on Nov. 5, 2015, provisional application No. 62/273,820, filed on Dec. 31, 2015.

(52) U.S. Cl.
CPC ........ *Y02D 70/1262* (2018.01); *Y02D 70/142* (2018.01); *Y02D 70/144* (2018.01)

(56) References Cited

U.S. PATENT DOCUMENTS

| | | |
|---|---|---|
| 2006/0020684 A1* | 1/2006 | Mukherjee .............. H04L 67/06 709/219 |
| 2006/0025106 A1 | 2/2006 | Byers et al. |
| 2007/0081477 A1 | 4/2007 | Jakkahalli et al. |
| 2008/0130595 A1 | 6/2008 | Abdel-Kader |
| 2009/0011743 A1 | 1/2009 | Johanson et al. |
| 2009/0279492 A1 | 11/2009 | Montemurro et al. |
| 2011/0047603 A1 | 2/2011 | Gordon et al. |
| 2011/0195687 A1 | 8/2011 | Das et al. |
| 2012/0116861 A1* | 5/2012 | Dobyns .............. G06Q 30/0234 705/14.34 |
| 2013/0124309 A1 | 5/2013 | Traasdahl et al. |
| 2013/0128811 A1 | 5/2013 | Bradish et al. |
| 2014/0171039 A1 | 6/2014 | Bjontegard |
| 2014/0181245 A1 | 6/2014 | Richardson et al. |
| 2014/0194153 A1 | 7/2014 | Salkintzis |
| 2015/0111523 A1 | 4/2015 | South |
| 2015/0149250 A1 | 5/2015 | Fein et al. |
| 2015/0289088 A1 | 10/2015 | Terrazas |

\* cited by examiner

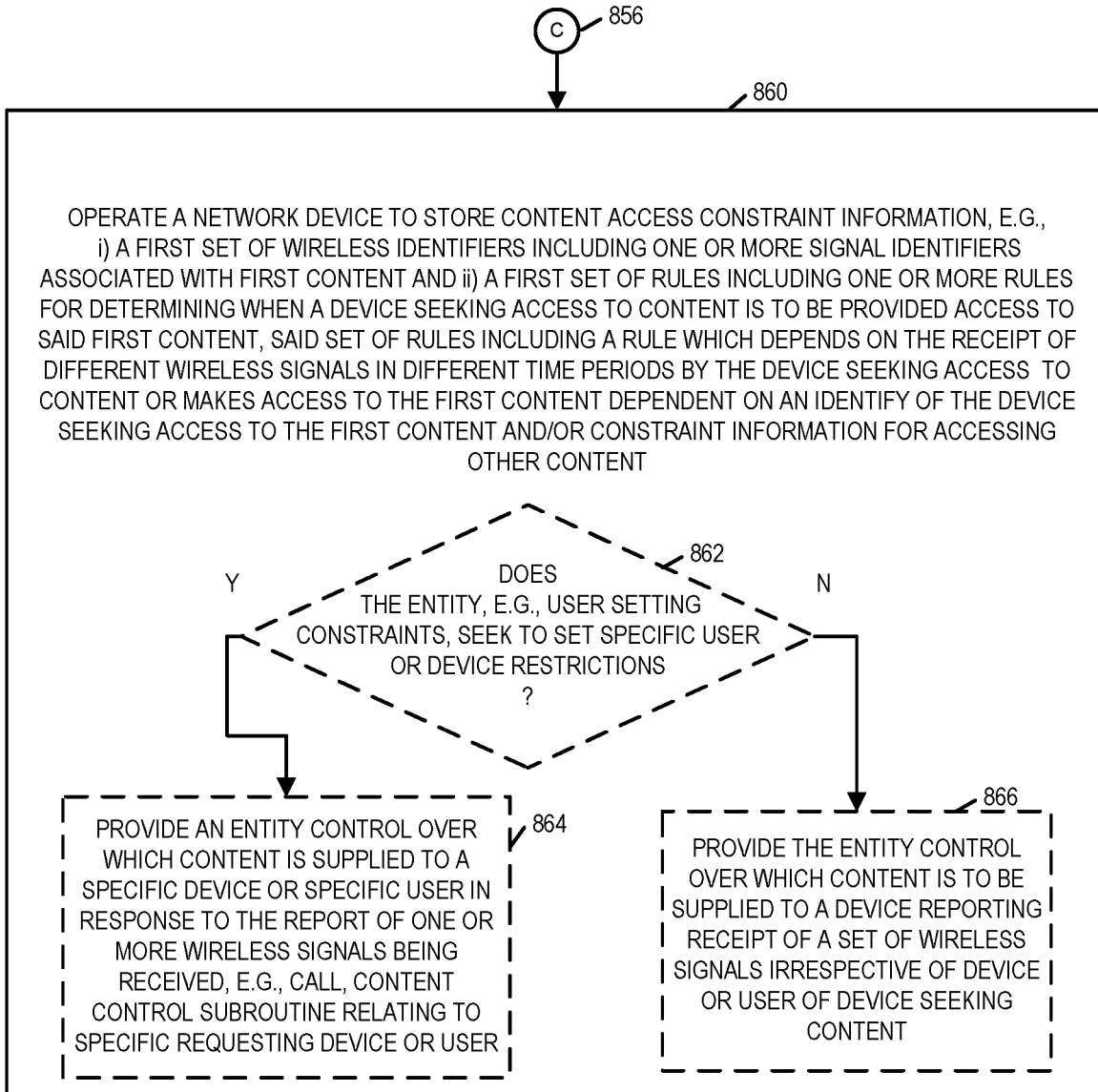
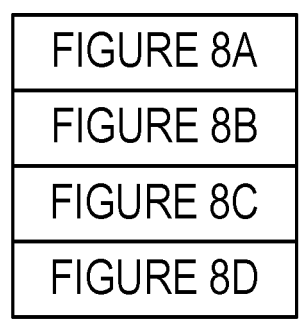
FIGURE 8D
FIGURE 8

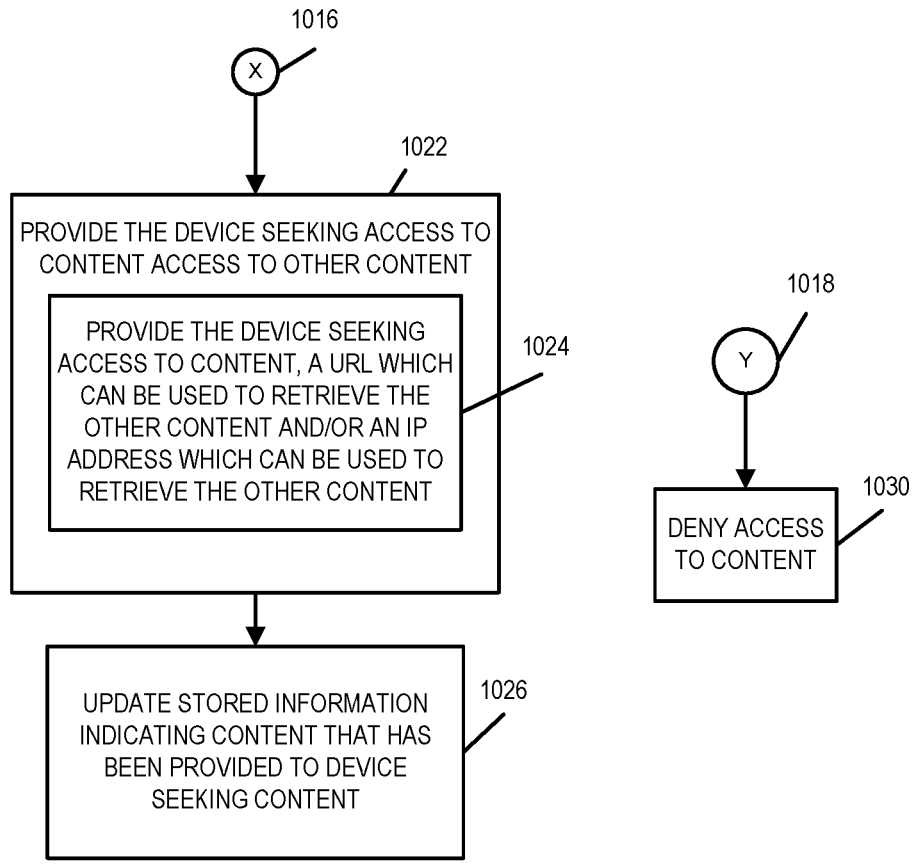

METHODS AND APPARATUS FOR ASSOCIATING CONTENT WITH ONE OR MORE WIRELESS SIGNALS AND/OR CONTROLLING ACCESS TO CONTENT ASSOCIATED WITH SUCH SIGNALS

RELATED APPLICATIONS

The present application claims the benefit of U.S. Provisional Patent Application Ser. No. 62/251,678, filed on Nov. 5, 2015 and U.S. Provisional Patent Application Ser. No. 62/273,820, filed on Dec. 31, 2015 and is a Continuation in Part of U.S. patent application Ser. No. 15/062,175 filed on Mar. 6, 2016, which are hereby expressly incorporated by reference in their entirety.

FIELD

The present application relates to systems for providing access to content and, more particularly to methods and apparatus for providing devices which receive wireless signals access to content associated with one or a set of wireless signals e.g., in a registrar or other network device.

BACKGROUND

There is a need to be able to communicate content, e.g., images, text, etc, to users of wireless devices. For example, in some cases a person may seek to communicate information to a friend or relative to share a personal photo, video and/or other information for personal reasons.

In other cases, a person may seek to communicate information as part of a game or for promotional or informational reasons, e.g., to communicate information about a historic site or business. In view of the above, it should be appreciated that there is a need for improved methods and/or apparatus for communicating information for one or more applications or purposes.

While it may be desirable to communicate information to others, in many cases the information is to be limited in its distribution to individual users or devices. In many cases it would be desirable if content distribution were subject to one or more constraints, e.g., in terms of the users or devices to which the content is distributed and/or a proximity constraint. For example, it may be desirable to limit content distribution to periods of time when the device seeking access to content is in close proximity to devices of other users who form a group to devices which form a group. In addition to proximity constraints it may also be desirable if time and/or changes in groups over time could be taken into consideration when determining whether to allow access to particular content.

While content to be distributed may be fixed, it would be desirable if in at least some embodiments one or more entities could easily control or modify content which is distributed and/or constraints associated with whether or not a specific piece of content is made available to a device seeking access to content.

In view of the above, is should be appreciated that there is a need for improved methods of distributing content, modifying rules used to control content distribution and/or updating or changing content which is to be distributed.

SUMMARY

Methods and apparatus for associating content with wireless signals, e.g., beacon signals, and for controlling the ability to access or alter content provided in response to an indication that one or more wireless signals have been received are described. The methods and apparatus are well suited for use with devices which transmit wireless signals, e.g., beacon signals, that can be received by other devices. In some embodiments a beacon transmitter is placed in a product such as a teddy bear, story book, toy, piece of jewelry, etc.

Devices in the range of the wireless transmitter detect the signal and report the receipt of the signal to a registry device, e.g., a server accessible via the Internet. The registry device takes into consideration which wireless signal or signals were reported as being received in a given time period, the identity of the device reporting the receipt of the signal, the time period in which the wireless signal was received, e.g., a preceding or current reporting time period, and/or other factors such as what wireless signals were reported as having been received in a previous time period. Based on one or more rules that can be specified by an entity which has control over access to content, the registry device determines which content, if any, to supply to the device, e.g., cell phone, laptop computer, notepad, Ebook reader, etc., reporting the receipt of the wireless signals. In addition to providing different levels of content access to different entities, different entities can, and sometimes are, provided with different levels of control with regard to the alteration of content and/or the rules or time constraints that control users access to content.

Thus in various embodiments one or more entities are provided with a level of content control and/or access to content. Entities which may be provided some level of control over content and/or access to content include, but are not limited to, a manufacturer of a device which transmits a wireless signal or into which a wireless signal transmitter is placed, a distributer of a device which transmits a wireless signal, a master, e.g., owner, of a device which transmits a wireless signal and/or users of devices which receive wireless signals with which content is associated. The users of devices which receive wireless signals may be, e.g., a friend or someone in proximity to a wireless device which transmits a wireless signal.

As noted above, the level of access and/or control of content associated with a wireless signal can be, and sometimes is, rule and/or time based. Rules may take into consideration the identity of the device, and thus user, reporting the receipt of wireless signals. Rules may also require or take into consideration what wireless signals were received by a device in a current or preceding time period.

Rules may specify a set or sequence of wireless signals which must be received by a wireless device, e.g., in a time period, to gain access to specific content associated with a wireless signals and/or which device is reporting receipt of the wireless signal or signals. The rules may specify a simple union of wireless signals that need to be reported to gain access to content or more complex constraints involving a change in the set of reported wireless signals which were received from one time period to another time period. The change may be the reporting of receipt of a specific additional wireless signal after the reporting of the receipt of one or more other wireless signals. The change may also be reporting of the receipt of fewer wireless signals than were previously received indicating that the reporting device is no longer in the presence of the device which was transmitting the wireless signal which is no longer being reported as being received.

To help understand various exemplary embodiments, the embodiments will be explained in the context of users A, B, C. User A uses device DA which transmits wireless signal, e.g., a beacon signal, BSA. User B uses device DB which transmits wireless signal BSB. User C uses device DC which transmits wireless signal BSC.

Users A, B, C may set up rules which allow them to access to first shared content (SC-ABC) when they are in one another's presence but not at other times. In such a case the rule for accessing shared content may be that to be provided access to content the identify of the reporting the receipt of wireless signals is in the group of (DA, DB, DC) and the reported received signals must include at least two of the signals in the group of (BSA, BSB, or BSC).

Thus when the users are together, device DA should receive signals BSB, BSC, identify itself to the register using the value of BSA or another identifier of device DA and report the receipt of signals BSB, BSC to gain access to the first shared content SC-ABC. Device DB should receive signals BSA, BSC, identify itself to the register using the value of BSA or another identifier of device DB and report the receipt of signals BSA, BSC to gain access to the first shared content SC-ABC. Device DC should receive signals BSA, BSB, identify itself to the register using the value of BSA or another identifier of device DB and report the receipt of signals BSA, BSC to gain access to the first shared content SC-ABC. The same or similar rule can be used to allow editing or uploading of content as opposed to simply access to stored content. Thus to edit or alter shared content SC-ABC a device DA, DB, DC can be constrained so that alteration is possible to when the three device DA, DB and DC are in wireless range of one another.

Examples where such constraints on content access may be useful are when a group of friends want to keep content private and available to one another only when they are together. For example a girlfriend may want certain pictures available to her boyfriend only when they are nearby, e.g., in wireless signal range and not at other times. Accordingly, the wireless signal constraints serve not only to facilitate a sense of community or special access to content but can also serve as a security constraint so that content is not made available to an unintended party even if they get access to one of the boy friends or girlfriends phones when the other party is not nearby.

The registry device, e.g., a beacon management and/or content server device, can be configured to provide different content than the group content SC-ABC when a device in the group reports receipt of a set of wireless signals less than the full set of signals transmitted from the other devices in the group. For example, after providing shared content SC-ABC, to device DA which reported receipt of wireless signals BSB and BSC in a time period, the register device may provide shared content SC-BC_F_SC-ABC when device A reports the receipt of wireless signals BSB but not wireless signal BSC, after having reported receipt of both signals, indicating that device DC has left the range of device A. The content may be, for example, a message from the user of device C indicating that he misses the users of devices DA and DB.

Group constraints of the type discussed above can also be used to encourage the acquisition of multiple devices with wireless transmitters, e.g., toys. For example an Ebook capable of detecting wireless signals may come with a subscription to a story service. The Ebook may be device DA and toys such as stuffed animals may be device DB and DC. Device DB may be a bear and device DC may be a tiger. The content, e.g., story or stories, provided may be dependent on what devices are indicated by the reported receipt of wireless signals to be in proximity to the Ebook. In such a case the EBook device DA may receive different stories if it reports the receipt of signals from device B (bear) alone, device C (donkey) alone or device B and C (bear and donkey). For example in such an embodiment a bear story may be provided when device DA reports the receipt of wireless signal BSB alone, a donkey story may be provided when device DA reports the receipt of wireless signals BSC alone but access to a story of a bear and donkey may be provided when device A reports receipt of wireless signals BSB and BSC. If a friend brings a toy with another beacon transmitter, e.g., device DD such as a tiger, Ebook device DA may detect and report the signals BSB, BSC and BSD and provide a story about a bear, donkey and tiger to the user of the Ebook. Thus, the user of device DA is encouraged to acquire devices with other wireless transmitters and/or to invite friends over with their toys including transmitters to create an enhanced group play experience.

Ownership of a device may be and sometimes is automatically reported to the register device and documented in the register device when a user purchases a device and provides identification information at the time of purchase. Thus ownership rights and the control of content associated therewith maybe automatically provided at the time of sale of a device including a wireless transmitter, e.g., a beacon signal transmitter that transmits a predetermined beacon signal. This is commonly the case when the device including the wireless transmitter is purchased over the Internet. The identification maybe a user name, device identifier of a device owned by the user and known to the register device and/or an identifier of a wireless signal, e.g., beacon ID, which has been previously associated with the owner in the wireless register.

Alternatively, rather than ownership information being automatically registered at time of purchase with the register service a user may receive a device with a wireless transmitter that transmits a unique beacon signal, e.g., beacon ID. A device code may be included on the packing associated with the device. Upon purchasing the device the owner may and sometimes does log in with the register device by identifying him or herself. After logging in with the register device the owner than provides the code or has a device of the owner communicate the beacon ID transmitted by the purchased device to the register service. The register service stores information that the user registering the device identified by the code or beacon signal ID is the owner of the device to which the code or beacon ID corresponds and give the registering owner the privileges in terms of content access and control of content associated with the beacon ID of the newly purchased device that go with ownership of the device.

In some embodiments the owner of a device which transmits a beacon signal has the ability to alter the content associated with the beacon signal and which is supplied to devices reporting receipt of the beacon signal. For example, a parent may buy a device, e.g., teddy bear, with a beacon transmitter in it and provide it to a child. The parent registers as owner of the beacon transmitter device provided to the child and is given authority to associate content, e.g., family photos with the beacon signal which is transmitted by the beacon transmitter. The child using a cell phone or other device and an application on the cell phone or other device detects the beacon signal transmitted by the wireless transmitter device, e.g., bear, provided by the parent it automatically reports the receipt of the beacon signal(s) to the register device, e.g., via the Internet. The register device determines from the reported receipt of the particular beacon signal transmitted by the bear that the device reporting receipt is to be provided access to content associated with bear. Content provided by the parent and associated with the bear's beacon signal is then automatically made available to the cell phone of the child for display. The parent can provide multiple pieces of content, e.g., photos or messages, to be provided in sequence or depending on what set of wireless signals the child's cell phone reports being received. For example when the child's cell phone reports receipt of the bear beacon signal along with a beacon signal provided to a sibling the message or content maybe different from the content provided when only the bear's beacon signal is reported as being received. Also, the parent can configure the register device to provide access to yet other content when after multiple beacon signals are reported fewer or different beacon signals are reported which may be indicative of, e.g. the sibling leaving the room in which the child with the bear is located.

In other embodiments the manufacturer or distributer of a toy with a beacon transmitter is allowed to associate content with the beacon signal transmitted by the beacon transmitter. This maybe at the time a child orders or purchases a toy. For example a subscribing to a set of stories purchased with the toy maybe associated with the beacon signal transmitted by the toy. In other cases, a child or other purchaser can select between a variety of beacon transmitters, for example in the shape of a heart, which can be inserted into a toy. The manufacturer associates different content with the beacon signals transmitted by different hearts. Thus by selecting and inserting a beacon transmitter in the shape of a heart, the child or purchaser can obtain access to different content. For example a pink heart may provide access to girl stories while a purple heart might provide access to war stories and a blue heart might provide access to boy stories. Thus beacon transmitters can be used as part of a customizable toy.

Numerous variations on the above described methods and apparatus are possible. Additional features, embodiments and benefits of the various embodiments are discussed in the detailed description which follows. While various embodiments have been discussed in the summary above, it should be appreciated that not necessarily all embodiments include the same features and some of the features described above are not necessary but can be desirable in some embodiments.

BRIEF DESCRIPTION OF THE FIGURES

FIG. 8D is a fourth part of the flow chart shown in FIG. 8A.

FIG. 8 shows have FIGS. 8A, 8B, 8C and 8D form a single flow chart.

FIG. 10B shows a first part of a content access subroutine and the steps of the subroutine which maybe implemented the steps of a content control subroutine which maybe implemented by a register node such as the beacon management and/or content server of FIG. 1.

FIG. 10 shows have FIGS. 10A and 10B form a single flow chart.

FIG. 11 shows a subroutine that can be used for determining if a device that receives wireless signals and is seeking access to content should be provided access to content and/or what content the device should be provided access to.

DETAILED DESCRIPTION

Methods and apparatus allow a wireless device, capable of detecting one or more signals transmitted by another device, e.g., a beacon transmitter, to detect a transmitted signal and report the receipt of the wireless signal or signals to a register device 106 which is responsible for providing access to content associated with wireless signals. Access to content maybe provided directly by the register device supplying content associated with the wireless signals reported as being received to the device reporting the signals and thereby seeking access to content, by providing a URL or IP address which can be used by the device which reported receipt of the signals to retrieve corresponding content or in a variety of other ways.

Figure 1:
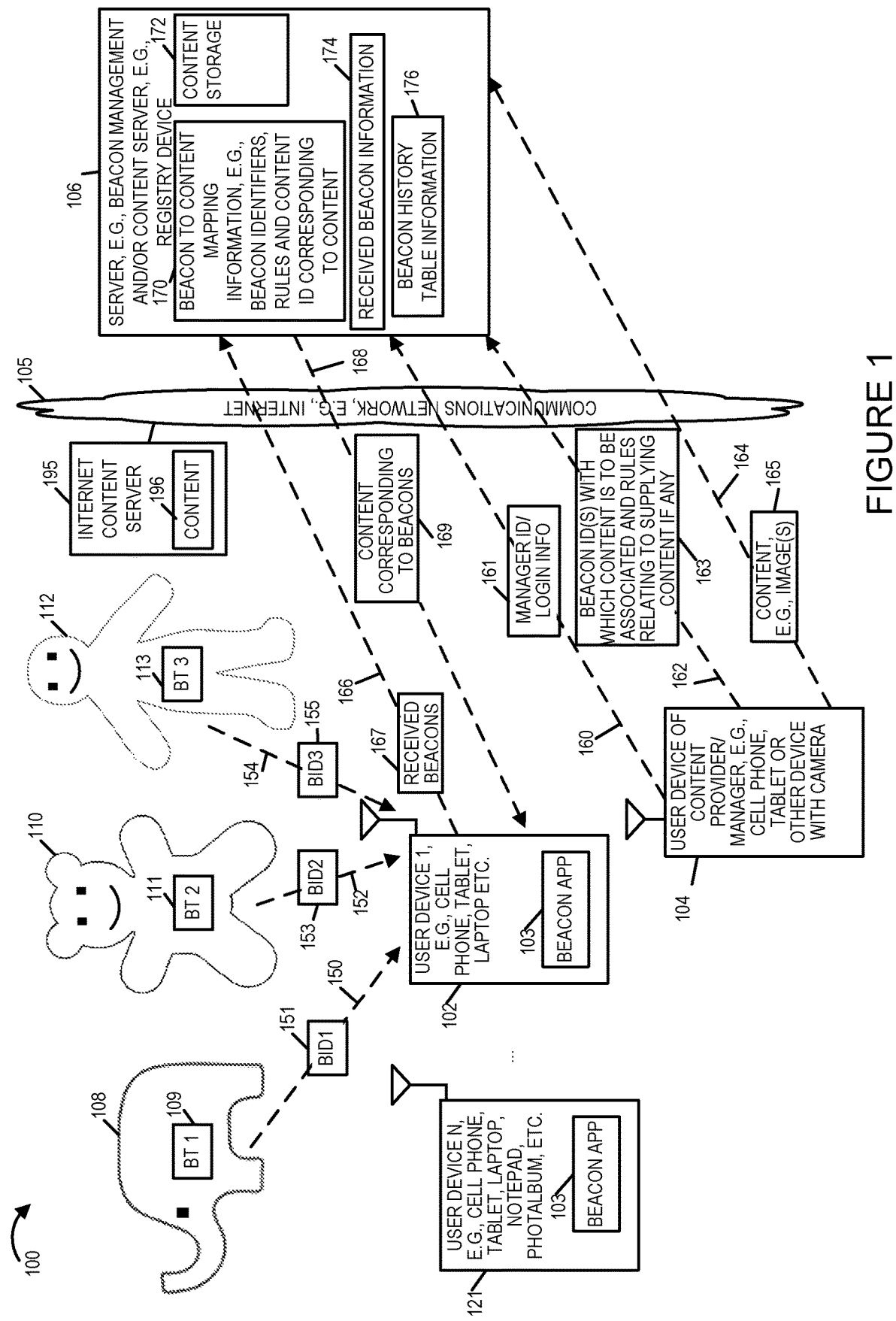
FIG. 1 illustrates an exemplary system including devices which are equipped with beacon transmitters, exemplary user devices, an exemplary user device of a content provider/manager, a communications network, and a server, e.g., a beacon management and/or content server, in accordance with an exemplary embodiment.

FIG. 1 illustrates an exemplary system 100 includes devices (108, 110, 112), e.g., stuffed animals, which are equipped with beacon transmitters (BT 1 109, BT 2 111, BT 3 113), respectively, exemplary user devices (device 1 102, e.g., a cell phone, tablet laptop, etc. including a beacon app 103, . . . device N 121, e.g., a cell phone, tablet laptop, etc. including a beacon app 103), an exemplary user device of a content provider/manager 104, e.g., a cell phone, tablet or other device with a tablet, a communications network 105, e.g., Internet, an Internet content server 195 including content 196, and a server 106, e.g., a beacon management and/or content server, e.g., a registry device. The devices (108, 110, 112) include battery powered beacon transmitters (109, 111, 113), which transmit beacon signals (150, 152, 154) communicating beacon IDs (BID1 151, BID2 153, BID3 155), respectively. The devices (108, 110, 112) are mobile and can be taken on trips and/or to play meetings. User devices which are content provider/manager devices, e.g., device 104, can detect the transmitted beacon signals (150, 152, 154) and can manage content, e.g., supply content to the content server to be supplied to devices reporting receipt of one or more of the beacon signals. Exemplary signal 160 communicates manager ID/Login information 161 from user device 104 to server 106 via communications network 105. Exemplary signal 162 communicates beacon information 163 including beacons ID(s) with which content is to be associated and rules relating to supplying content if any to server 106 via communications network 105. Exemplary signal 164 communicates content 165, e.g., images, corresponding to reported beacons from user device 104 to server 106 via network 105.

User devices, e.g., device 102, can be used to access content by reporting receipt of one or more beacon signals to the content sever 106 as part of seeking access to content. The devices receive in response, access to content determined by the rules and/or information stored in the content server that indicate what content should be supplied based on the reported received beacon signals and/or what content was previously supplied or what beacon signals were previously reported as being received. Providing access to content may involve the server providing the content or providing a URL, IP address or other information which can be used, by the device seeking access to content, to retrieve content. For example the device may receive a URL or IP address which can be used to access a web server which supplies the content to be accessed. Exemplary signal 166 communicates received beacon information 167, e.g., included received beacon IDs, to server 106, via network 105. Signal 168 communicates content 169 corresponding to the reported received beacon signals from server 106 to user device 102.

In various embodiments, at least one of the user devices in system 100, e.g., device 104, performs management functions with regard to beacon associated content, and some of the user devices in system 100, e.g., devices (user device 1 102, . . . , user device N 121) do not perform management functions with regard to beacon associated content.

Server 106, e.g., a beacon management and/or content server, includes beacon to content mapping information 170, e.g., beacon identifiers, rules, and content ID corresponding to content, content storage 172, received beacon information 174, and a beacon history table 176. Beacon to content mapping information 174 includes, e.g., information 162 and/or is based on information 162. Content storage 172 includes, e.g., content 165. Received beacon information 174 includes, e.g., information 167.

Figure 2:
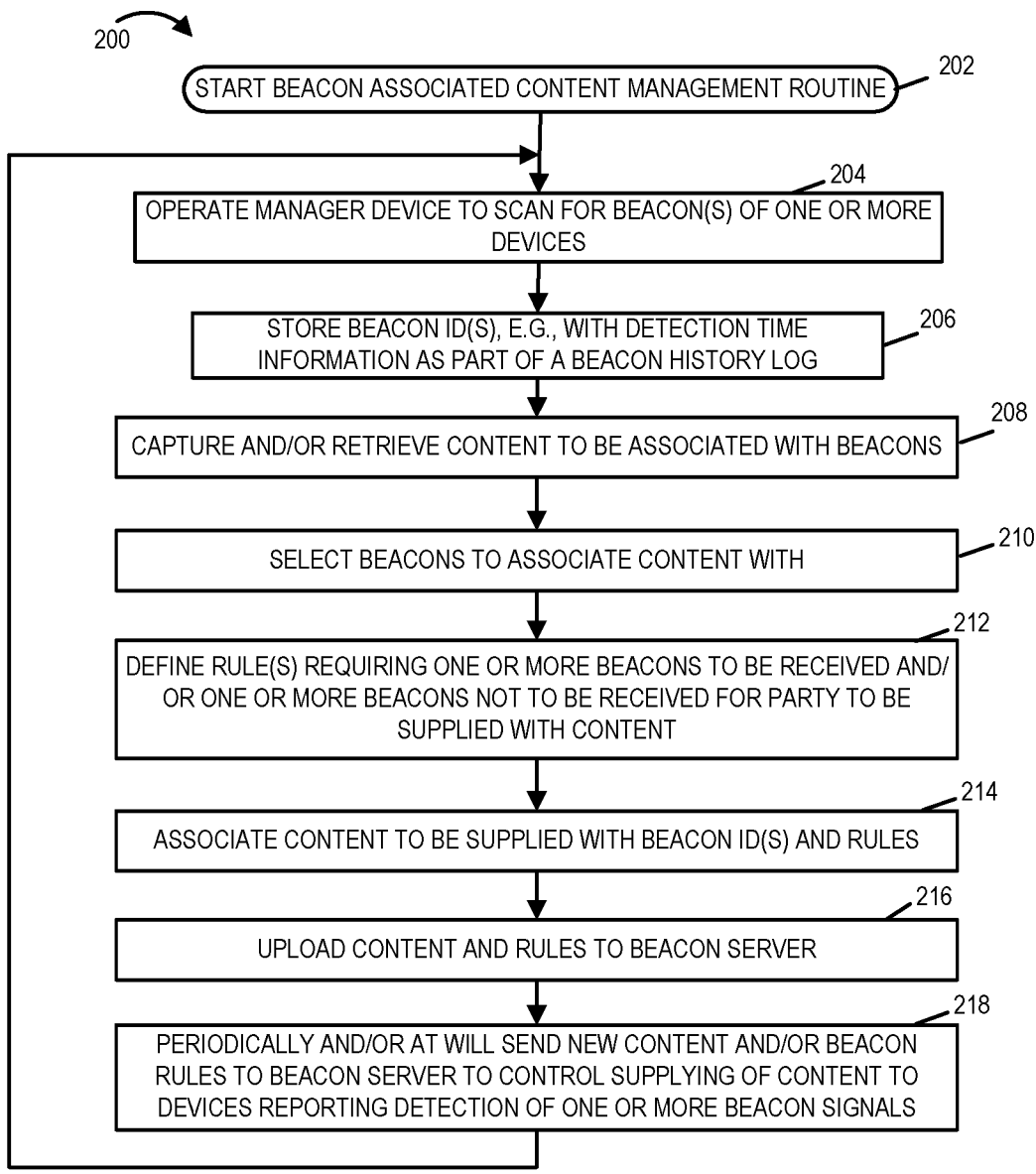
FIG. 2 is a flowchart of an exemplary method of operating a manager device, e.g., a user device of content provider/manager, in accordance with an exemplary embodiment.

FIG. 2 is a flowchart 200 of an exemplary method of operating a manager device, e.g., user device 104 of content provider/manager, in accordance with an exemplary embodiment. Operation starts in step 202 in which the manager device is powered on and initialized and a beacon associated content management routine is started. Operation proceeds from step 202 to step 204.

In step 204 the manager device is operated to scan for beacon(s) of one or more devices. The manager device may, and sometimes does, detect beacon(s) and recovers the information included in the beacon(s), e.g., including beacon ID information. Operation proceeds from step 204 to step 206.

In step 206, the manager device stores beacon ID(s), e.g., with detection time information as part of a beacon history log. Operation proceeds from step 206 to step 208.

In step 208 the manager device captures and/or retrieves content to be associated with beacons. Operation proceeds from step 208 to step 210. In step 210 the manger device selects beacons to associate content with. Operation proceeds from step 210 to step 212.

In step 212 the manager device defines rule(s) requiring one or more beacons to be received and/or one or more beacons not to be received for the party to be supplied with content. Operation proceeds from step 212 to step 214. In step 214 the manager device associates content to be supplied with beacon ID(s) and rules. Operation proceeds from step 214 to step 216. In step 216 the manger device uploads content and rules to a beacon server. Operation proceeds from step 216 to step 218. In step 218 the manager device periodically and/or at will sends new content and/or beacon rules to the beacon server to control supplying of content to devices reporting detection of one or more beacon signals.

In one embodiment, wireless transmitters, e.g., beacon transmitters, are embedded in stuffed animals, robots, toys or other devices such as devices 108, 110, 112. Beacon transmitters may be implemented as WiFi beacon transmitters, LTE compatible transmitter devices or in another form where the beacon transmitter transmits a signal communicating information, e.g., one or more beacon identifiers, which identify the beacon signal. Different beacon transmitters may, and in some embodiments do, transmit different beacon identifiers, e.g., Beacon IDs.

In various embodiments, a content provider can detect the beacon ID transmitted by a beacon transmitter in a toy, e.g., stuffed animal or other device. The content provider may be, and in some embodiments is, a person who buys the toy, e.g., stuffed animal to give to someone else. In other embodiments, the content provider may be the toy manufacturer, a promoter associated with a promotion in which the toy is given away or some other entity who wishes to provide content under some situations to some to who the toy including the beacon is given or will come into proximity to the toy, e.g., stuffed animal including the beacon signal.

In some embodiments the content provider after detecting the beacon signal sends an identifier to a server, e.g., a beacon management and/or content sever 106, identifying the beacon transmitted by the device with which content is to be associated. The content provider may, and sometimes does, also send content to be associated with the beacon to the beacon server 106. The content provider, e.g., owner of the device which transmits the beacon signal, can and sometimes does set up an account with the beacon server 106 and logs in using a secure password to manage the content associated with one or more beacon identifiers. The detection of the beacon identifier and communication of content to be associated with the beacon identifier can be done using a cell phone 102 and/or other device capable of detecting beacon signals and communicating with the content server 106. Images captured by a camera included in the cell phone of the content provider may, and sometimes does, provide content in the form of still images and/or video to be associated with the beacon identifier communicated to the server 106. In the case where the beacon identifier is known to the content provider because of information supplied with the beacon transmitter inserted into the device or toy such as a registration ID that is supplied by the owner to the server 106, the content provider may enter the beacon identifier and associate content with the identifier without first having to scan the device to detect the beacon signal and identifier transmitted by the device or otherwise communicated by the beacon signal.

The toy or other device 108, 110 or 112 including the beacon transmitter may be given to someone, e.g., as a gift, by the content provider. Alternatively the toy or other device 108, 110 or 112 may be sold to someone.

The user receiving toy, e.g., stuffed animal or device, may use his/her cell phone 102 or another user device such as a notepad to detect one or more beacon signals. The scanning may be done by an application 103 running on the cell phone 102, e.g., an application which will be referred to herein as a beacon based browser When the beacon based browser app 103 detects a beacon signal it stores the information in a beacon history log along with information about the time the beacon was detected. The user device 102 detecting the beacon may, and in some embodiments also does contact the beacon/content server 106 reporting detection of the beacon signal and/or other signals detected at a given time and seeking content associated with the received beacon signal and/or a set of signals which were detected.

The content server 106 checks its rules for supplying content corresponding to beacon signals which were reported as being received and, if there is stored content corresponding to reported beacon signal or signals and the logic associated with the content indicates it should be provided to a user or device in response to a reported detection event, access to the corresponding content is provided to the user, e.g., the content is supplied or the user device is provided with information which allows the content to be retrieved g., from another server. For example the user of a cell phone 102 detecting a beacon signal may be provided images or video associated by a content manager, e.g., owner of the device which transmitted the received beacon signal, with the reported received beacon signal.

Thus, for example, a boyfriend may give a cute stuffed animal 110 to his girlfriend which includes a beacon transmitter that transmits a beacon with a known beacon ID. The boyfriend can upload pictures to the content sever 106 and have them associated with the known beacon id of the beacon signal transmitted by the cute stuffed animal 110. The girlfriend can access the pictures and/or other contact using her cell phone 102 which detects the beacon signal transmitted by the cute stuffed animal 110, accesses the content server/register device 106, indicates the beacon identifier of the beacon signal transmitted by the animal 110 and time of receipt to the content server 106. The girlfriend will receive on her cell phone 102, in response, access to content the boyfriend associated with the beacon identifier. Over time the boyfriend, as the content manager and registered owner of bear 110 with beacon transmitter 111, may change the content associated with the beacon identifier corresponding to the stuffed animal 110 given to his girlfriend and as she access the content she will see the new content uploaded by her boyfriend on her cell phone 102. The same technique can be used to provide a grandmother or other family member provided with a stuffed animal to content uploaded by the content manager. For example a grandmother in a nursing home could be provided a stuffed animal 110 with a beacon transmitter 111. The grandmother could then use a notepad 121 running the beacon browser application 103 and obtain easy access to image or other content managed by the gift giver. In some embodiments the browser app 103 is built into an electronic photo display device which automatically retrieves photos and/or video content associated with beacon signals it detects. In such embodiments the person being provided the electronic photo album 121 need not have to execute a browser application with the application 103 automatically being enabled and set to retrieve and display content corresponding to detected beacon signals. In such a case while multiple individuals may have an electronic photo album implemented in accordance with the invention, e.g., in a nursing or retirement home, what images are displayed will depend on what beacon transmitters, e.g., stuffed animals 108, 110, 112 with embedded beacon transmitters, are placed in proximity to the photo album 121. Thus a person may be provided access to family photos or other content managed and supplied by another family member, friend or other content manager without having to know how to use a cell phone 102 or other device with a beacon browser application 103 that may need to be selected and executed by the user. In this manner one party can easily communicate photos and/or content to another person to whom a toy including a beacon transmitter 109, 111, or 113 is provided.

In some embodiment conditional logic may be associated with content to make content delivery contingent upon receipt of a set of beacon signals and/or other conditions such as time conditions and/or the absence of a signal.

Consider for example that some content can be associated with a set of beacon signals so that it is provided when signals corresponding to beacon identifiers BID1 and BID2 are both received within a given detection time period. Such a user of "AND" logic can be used to support embodiments where the content to be provided is to change based on the set of beacon signals detected within a time period.

For example, some content may be provided if the first BID1 transmitted by a first stuffed animal is detected but different content may be provided if a device reports detection of a set of beacon IDs, e.g., BID1, BID2 and BID3 in a given time period. Such an approach is particularly useful in game or toy applications where toy seller may seek to encourage the purchase of multiple stuffed animals 108, 110, 112. For example if a beacon ID transmitted by a toy pony is detected a video with a single pony may be streamed from the content server to the device reporting detection of the Beacon ID corresponding to the toy pony. However, if a Beacon ID corresponding to a toy pony and a toy horse is reported to a server content provided by a content manager associated with the "AND" of the two signals may be provided instead. Such content may include a video or story about a pony and a horse going on an adventure together for example while reporting of the pony associated beacon signal alone would result in content corresponding to just a phony story being provided reporting of the beacon id associated with the horse toy would result in a story or video corresponding to just a horse being provided. By rewarding users with more involved stories or stories corresponding to particular sets of animals corresponding to the set of stuffed toy animals a child has in his/her room or in close proximity, children and parents can be encouraged to collect the animals they want to hear stories about.

In addition, by providing content corresponding to groups of stuffed animals 108, 110, 112 or other toys based on the beacon signals individual the toys transmit, group play can be encouraged with children being encouraged to take different stuffed animals or toys to group play sessions to see what new games, videos or interactive utilities they can access based on the group of toys taken to the play session as opposed to their individual toys.

In some embodiments a history 176 of reported beacon signals and content access provided is maintained and used in determining what content should be supplied in response to a report of received beacon signals by a device. Thus the history information in table 176 maybe and sometimes is maintained on a per user device basis with different records recording the history corresponding to different devices 121, 102. For example, a boy and girl may exchange stuffed animals or other gifts including beacon signals.

When their cell phones 102 and/or other devices 121 are in proximity to the set of exchanged gifts and receive both signals they may be able to access a first set of shared content which either the boy or girl may manage. when only one signal is received, e.g., indicating the beacon transmitters are not in close proximity the boy maybe able to access only content managed by the girl who gave him the gift including the beacon signal the boy's cell phone can access while the girl can only access content managed by the boy who gave her the gift and includes the beacon signal associated with content managed by the boy.

In other variations, content supplied may depend not only on what set of beacon signals are received but what signals were received before and/or what content was previously supplied. For example sequential portions of a story may be supplied, e.g., on per day, in response to sequential accesses by a given device to the content sever reporting receipt of a particular beacon signal.

In some cases conditional logic which is based on some signals being reported but not others may be used with regard to what content is supplied. The conditional logic may further depend on history information with respect to what signal or signals were previously reported.

For example, after beacon signals corresponding to a boy and girl are reported and content provided, the same device corresponding to one of the boy and girl may be provided with a message from the other when a single one of the two beacon signals is reported after reporting detection of the two signals. For example, when a boy and girl access content within range of the respective gifts they exchanged they may be shown images or picture they previously took together. When one of them leaves the presence of the other taking the gift they received away, the beacon transmitter of only one of the gifts will be detected and a message from the other party may be displayed indicating how they miss not being with the party they just left.

Figure 3:
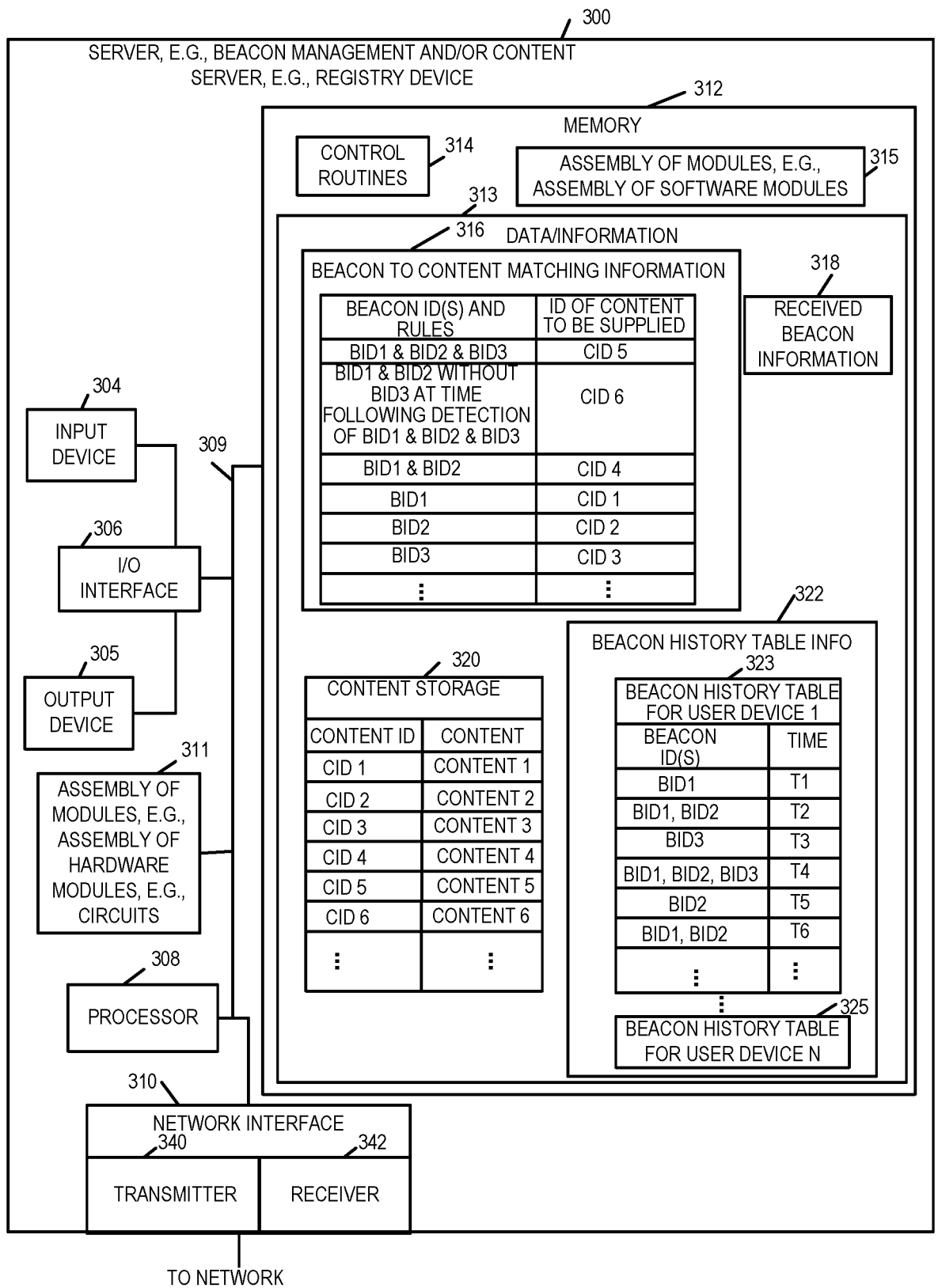
FIG. 3 is drawing of an exemplary server, e.g., a beacon management and/or content server, in accordance with an exemplary embodiment.

FIG. 3 is drawing of an exemplary server 300, e.g., a beacon management and/or content server, e.g., a registry server, in accordance with an exemplary embodiment. Exemplary server 300 includes an input device 304, e.g., a keyboard, mouse, etc., an output device 305, e.g., a display, an I/O interface 306, a processor 308, e.g., a CPU, a network interface 310, an assembly of modules 311, e.g., an assembly of hardware modules, e.g., circuits, a memory 312 and a bus 309. The input device 304 and output device 305 are coupled to the bus 309 via interface 306. The I/O interface 306, assembly of modules 311, processor 308, network interface 310 and memory 312 are coupled together via bus 309 over which the various elements may interchange data and information.

Network interface 310 includes a transmitter 340 and a receiver 342. The network interface couples the server 300 to a communications network, e.g., network 105, via which the server may communicate with user devices (102, ... , 121, 104). Memory 312 includes control routines 314, an assembly of modules 315, e.g., an assembly of software modules, and data/information 313. Data/information 313 includes beacon to content matching information 316, received beacon information 318, content storage 320 and beacon history information 322.

Beacon to content matching information 316 includes: (i) beacon ID(s) and rules and (ii) corresponding ID of content to be supplied. Various examples will not be described regarding exemplary stored beacon to content matching information. If BID 1, BID2 and BID 3 are reported to have been received by a user device, then content corresponding to content ID=CID 5 is to be supplied to the user device. If BID 1 and BID 2 are reported to have been received without BID 3 at a time following detection of BID 1, BID 2 and BID 3, then content corresponding to content CID=6 is to be supplied to the user device. If BID and BID 2 without BID 3 are reported to have been received by a user device and it was not at a time following detection of BID 1, BID 2 and BID 3, then content corresponding to content CID=4 is to be supplied to the user device. If only BID 1 is reported to have been received then content corresponding to content CID=1 is to be supplied to the user device. If only BID 2 is reported to have been received then content corresponding to content CID=2 is to be supplied to the user device. If only BID 3 is reported to have been received then content corresponding to content CID=3 is to be supplied to the user device.

Content storage 320 includes content IDs and corresponding stored content for each content ID. For example, content ID=CID 1 corresponds to content 1; content ID=CID 2 corresponds to content 2; content ID=CID 3 corresponds to content 3; content ID=CID 4 corresponds to content 4; content ID=CID 5 corresponds to content 5.

Beacon history table information 322 includes a beacon history table for each of a plurality of user devices (beacon history table for user device 1 323, . . . , beacon history table for user device N 325). Beacon history table for user device 1 233 includes reported beacon ID(s) detected by user device 1 and corresponding detection times. For example, exemplary information 323 indicates that user device 1 detected: beacon ID(s)={BID 1} at T1; beacon ID(s)= {BID1, BID 2} at time T2; beacon ID(s)={BID 3} at time T3; beacon ID(s)={BID 1, BID 2, BID 3} at time T4; beacon ID(s)={BID 2} at time T5; and beacon ID(s)={BID 1, BID 2} at time T6.

In response to the BID 1 detection at T1 by user device 1, the server 300, in accordance with the beacon to content matching information 316 and stored content 320, supplied content 1 to user device 1. In response to the BID 1 and BID 2 detection at T2 by user device 1, the server 300, in accordance with the beacon to content matching information 316 and stored content 320, supplied content 4 to user device 1. In response to the BID 3 detection at T3 by user device 1, the server 300, in accordance with the beacon to content matching information 316 and stored content 320, supplied content 3 to user device 1. In response to the BID 1, BID 2 and BID 3 detection at T4 by user device 1, the server 300, in accordance with the beacon to content matching information 316 and stored content 320, supplied content 5 to user device 1. In response to the BID 2 detection at T5 by user device 1, the server 300, in accordance with the beacon to content matching information 316 and stored content 320, supplied content 2 to user device 1. In response to the BID 1 and BID 2 detection at T6 by user device 1, the server 300, in accordance with the beacon to content matching information 316 and stored content 320, supplied content 6 to user device 1.

In one exemplary embodiment server 300 is server 106; beacon content to mapping information 316 is beacon to content mapping information 170; content storage 320 is content storage 172; received beacon information 318 is received beacon information 174; and beacon history table information 322 is beacon history table information 176 of system 100 of FIG. 1.

Figure 4:
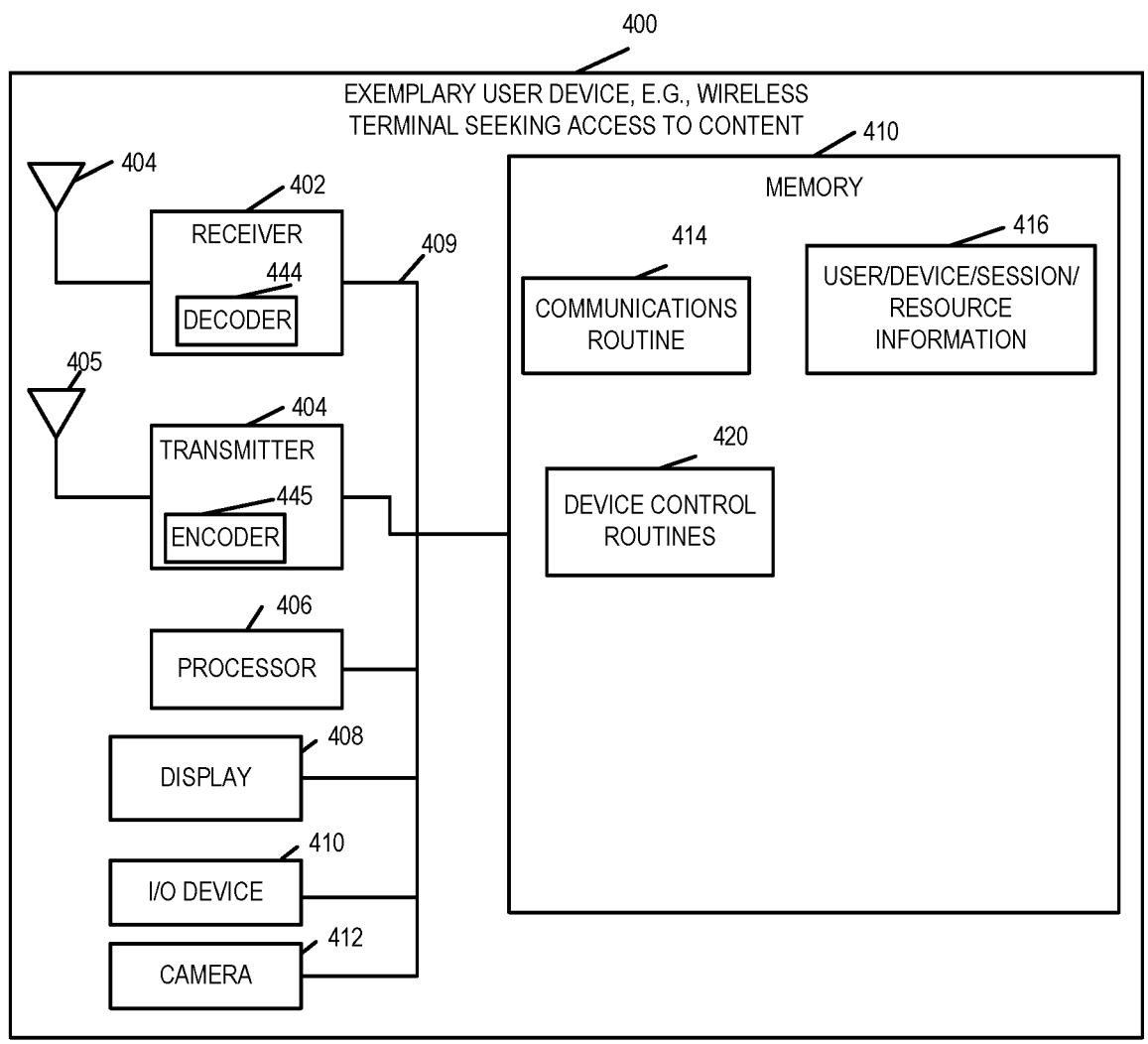
FIG. 4 is an exemplary user device, e.g., a user device of an end user of managed content, in accordance with an exemplary embodiment.

FIG. 4 is an exemplary user device 400, e.g., user device 1 102, in accordance with an exemplary embodiment. Exemplary user device 400 includes a wireless receiver 402, a wireless transmitter 404, a processor 406, e.g., a CPU, a display 408, an I/O device 410, a camera 412, and memory 410 coupled together via a bus 409 over which the various elements may interchange data and information. Wireless receiver 402 is coupled to a receive antenna 403 via which the user device may receive beacon signals, e.g., from beacon transmitters. Receiver 402 includes a decoder 444 for decoding received signals and recovering information. Receiver 402 also receives signals communicated from a server, e.g., via a base station in a communications network. Signals from the server include, e.g., content corresponding to a previously communicated set of detected beacons in accordance with content delivery rules. Wireless transmitter 404 is coupled to a transmit antenna 405 via which the user device may transmit signals to a server, e.g., indirectly via a base station in a communications network. Signals being communicated to the server include, e.g., information identifying a detected set of beacon signals, e.g., a set of detected beacon IDs, and a corresponding time.

Memory 410 includes a communications routine 414, device control routines 420 and user/device/session/resource information 416.

Figure 5:
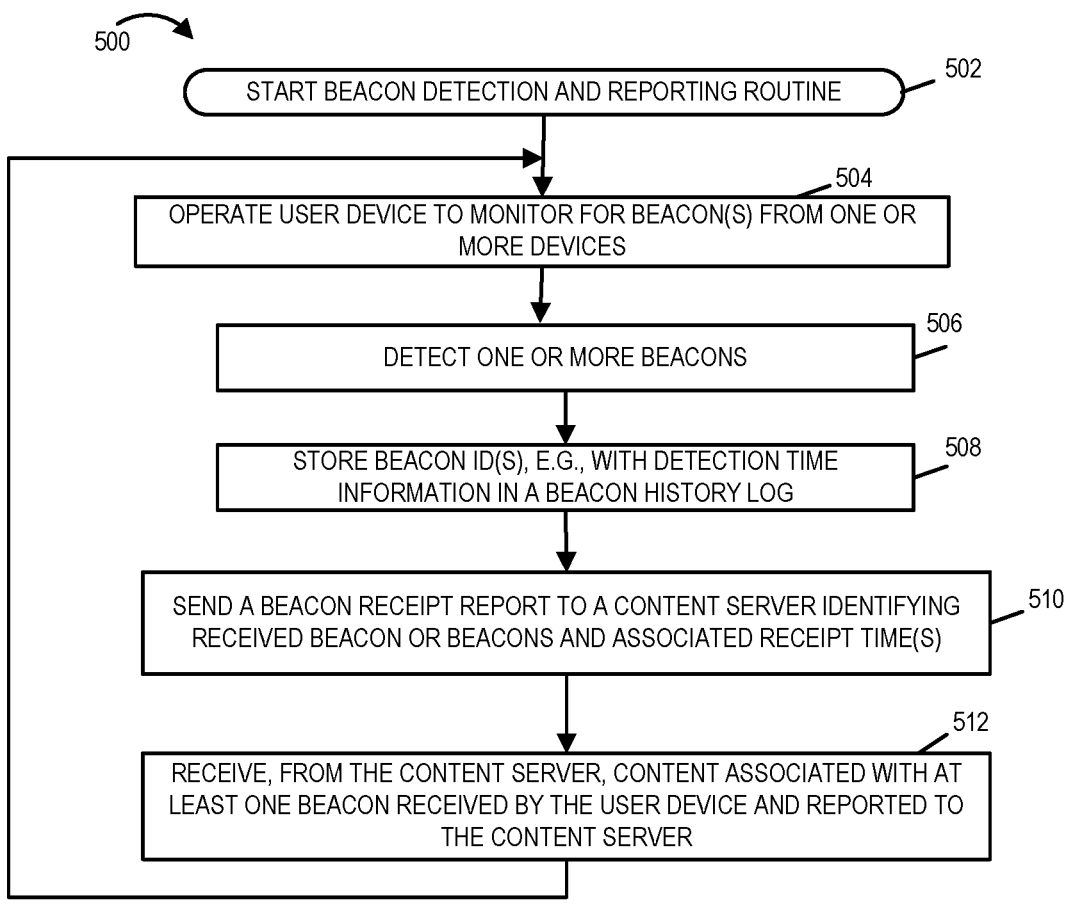
FIG. 5 is a flowchart of an exemplary method of operating a user device in accordance with an exemplary embodiment.

FIG. 5 is a flowchart of an exemplary method of operating a user device, e.g., user device 400, in accordance with an exemplary embodiment. Operation starts in step 502 in which the user device is powered on and initialized and the user device starts a beacon detection and reporting routine. Operation proceeds from step 502 to step 504, in which the user device monitors for beacon(s) from one or more devices. Operation proceeds from step 504 to step 506, in which the user device detects one or more beacons. Operation proceeds from step 506 to step 508. In step 508 the user device stores beacon ID(s), e.g., with detection time information in a beacon history log. Operation proceeds from step 508 to step 510, in which the user device sends a beacon receipt report to a content server identifying received beacon or beacons and associated receipt time(s). Operation proceeds from step 510 to step 512 in which the user device receives, from the content server, content associated with at least one beacon received by the user device and reported to the content server.

In one example, the user device implementing the method of flowchart 500 of FIG. 5 is user device 102, the server is server 106, and the detected beacons were transmitted by one or more or all of beacon transmitters (109, 111, 113).

Figure 6:
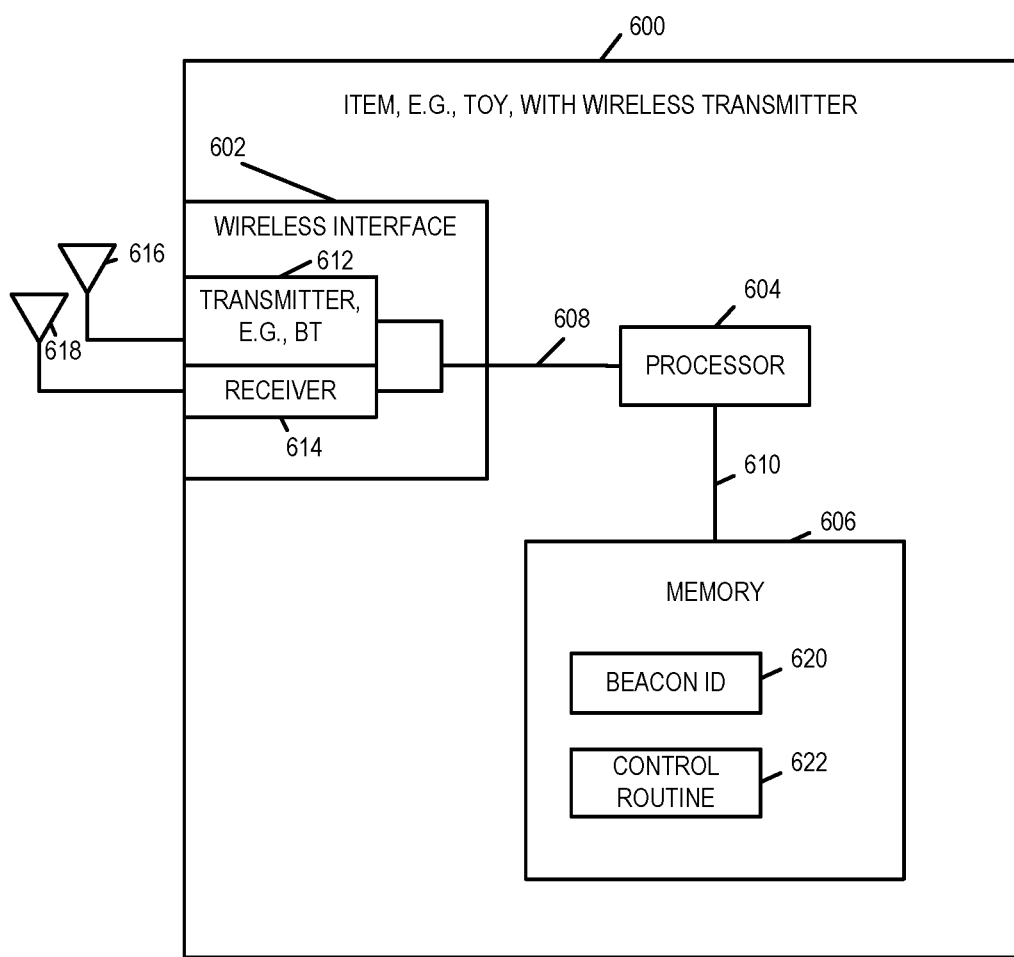
FIG. 6 is a drawing of an exemplary item, e.g., a toy, including a wireless transmitter, in accordance with an exemplary embodiment.

FIG. 6 is a drawing of an exemplary item 600, e.g., a toy, including a wireless transmitter 612, in accordance with an exemplary embodiment. Exemplary item 600 includes a wireless interface 602, a processor 604, and memory 606. Wireless interface 602 includes a transmitter coupled to transmit antenna 616, via which the item 600 can transmit wireless signals including beacons. Wireless interface 602 further includes a receiver 614 via which item 600 can receive wireless signals. Wireless interface 608 is coupled to processor 604, via communications link 608, e.g., a bus. Processor 604 is coupled to memory 606 via communications link 610, e.g., a bus. Memory 606 includes a beacon ID 620 and control routines 622. Control routines 622 are executed by processor 604 to control the operation of device 600. Control routines 622 are configured to control item 600 to generate and transmit beacon signals via wireless transmitter 612, said generated beacon signals communicating beacon ID 620. In one exemplary embodiment, devices (108, 110, 112) are each implemented in accordance with item 600 of FIG. 6, and each transmit a different beacon ID.

Figure 7:
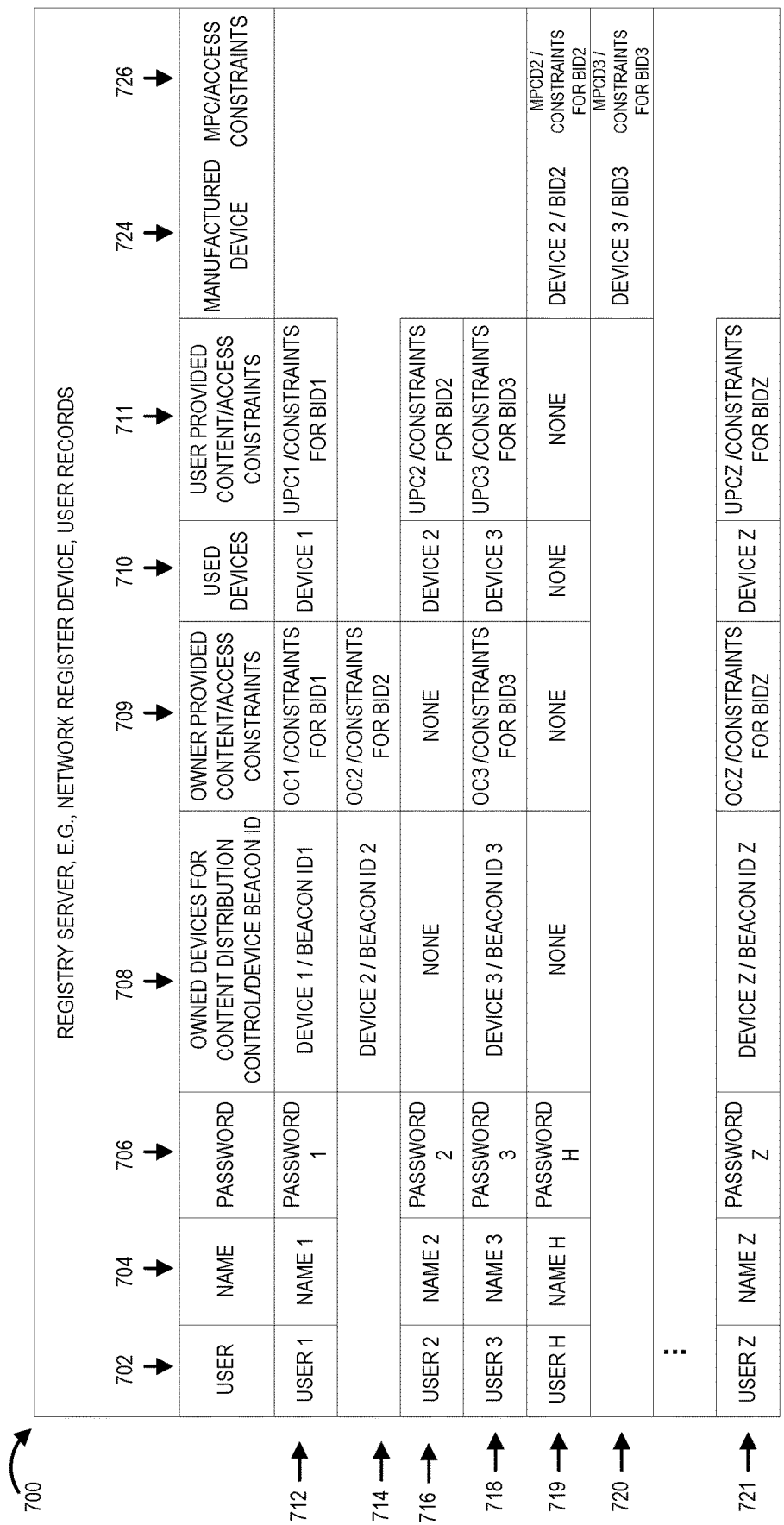
FIG. 7 is a drawing of an exemplary set of user records included in a registry server, e.g., a network registry device, in accordance with an exemplary embodiment.

FIG. 7 illustrates a set of records 700 in a registry device, e.g., the server 106 responsible for allowing users, owners, distributers, manufactures to manage content and supply access to content. The record 700 includes separate rows for each of the entities, owner, user, manufacturer, etc., which can associate content with a wireless signal and provide access constraints for the content they associate with a wireless signal.

The user records include records for a plurality of users of the registry service who have control over content or which can use wireless devices to report signals and access content. The user of the registry service may take on multiple roles with regard to a particular listed device that transmits a wireless signal, e.g., beacon, with which content can be associated. The listed owner of a device may be different than the user of the device. The records corresponding to a entity that has multiple different roles may be combined for compactness, e.g., with user and owner information included in the same row of the record table for example. The owner has control in some embodiments of content to be associated with wireless signals, e.g., beacon signals, transmitted by the device. For example, a parent may purchase a toy 108 for a child and be listed as the "owner" with control over content associated with toy 108 while the child may have his/her own record and be listed as a user of the device 108.

Each row 712, 714, 716, 718, 719, 720, . . . , 721 in the set of records 700 is a record corresponding to a user. Column 702 includes a user identifier. If a user identifier is not listed in column 702 for a row it indicates that the record corresponds to the user identified in row above the row without the user identifier. Thus multiple records, e.g., 712, 714 may be included for a single user, e.g., USER 1 or some other user. Column 704 includes a name of the user identified in column 1 704 while column 706 includes a password used by the user identified in the corresponding row to login to the register server 106. Column 708 identifies devices and, in some embodiments, includes the identifying Beacon ID transmitted by the device, that are owned by the user to which the record corresponds while column 710 lists devices that are used by the user of the row in which the used device is listed. Note that owner may be, and sometimes is, different from the user. For example Device 2 which transmits a beacon with beacon ID2 is owned by user 1 but used by user 2. Thus in row 712 owner provided content OC1 and corresponding owner provided access constraints (constraints for BID1) to the content associated with beacon ID1 shown in column 709, row 712 are provided by user 1 who is the owner of device 1. User 1 is also the owner of device 1 as shown in row 712 of column 708 and provides the user provided content (UPC1) and corresponding user provided access constrains for the user provided content associated with Beacon ID 1 as shown by the entry in row 712 column 711.

With regard to device 2 which transmits beacon ID 2 user 1 is the owner of device 2 as shown in row 714. However User 2 is the user of device 2 as indicated in row 716 column 710. Note that User 2 is not the registered owner of any wireless devices which transmit beacon signals with which content is associated and thus does not have owner content association privileges with any devices listed in record 700. However User 2 is the listed user of device 2 and can upload user provided content UPC2 and user provided constraints for access the user provided content UPC2 associated with BID2 transmitted by Device 2 as represented by the entries in row 716. While content is shown being stored in the registry server 700 instead of storing the actual content a link or address which can be used to store the content may be included in the registry in place of the content. In such a case the content may be, and sometimes is, stored on a different server or storage device than the storage device used to store record 700.

Row 716 is a record for User 2 while Row 718 includes a record for User 3 and row 720 includes a record for User Z. The record 700 may include separate rows for manufactures/distributers so that they can log in and associate content with devices for which they are identified as a manufacturer and/or distributer with corresponding content association and access control privileges.

Rows 719 and 720 are rows for a manufacturer with a user ID=user H, name=name H, and password=Password H. Column 724 is used to list devices which were manufactured by a manufacture while column 726 lists manufacturer provided content (MPC) and corresponding manufacturer provided access constraints.

Row 719 column 724 indicates that device 2 with beacon ID=BID2 was manufactured by the manufacturer with name H. Row 719 column 726 indicates that device 2 with beacon ID=BID2 has manufacturer provided content/access constraints MPCD2 which are constraints corresponding to BID2. Row 720 column 719 indicates that device 3 with beacon ID=BID3 was manufactured by the manufacturer with name H. Row 720 column 726 indicates that device 3 with beacon ID=BID3 has manufacturer provided content/access constraints MPCD3 which are constraints corresponding to BID3.

Thus it should be appreciated that the manufacturer can associated content with devices. While the manufacturer may make multiple toys of the same type the content associated with the particular toy via the content registry allows the manufacturer to sell different versions of the same toy with the main difference in some cases being how much content the manufacture associates via the registry 106 with the toy which includes a wireless transmitter. For example one version of the bear may provide access to a limited set of content, e.g., stories, while another version of the same bear may be associated with a larger set of content, e.g., a full set or series of stories which can be accessed when the beacon signal from the bear is received.

In some embodiments, the owner of a device may have different content uploading and association rights than the user of the device. For example, in some embodiments the owner of the device can associate and provide content which is accessible to the listed user of the device and other content which is accessible to others, e.g., entities which are not listed as users but which may, like the listed user, report receipt of wireless signals transmitted by the device. Rules and/or constraints in terms of what wireless signals need to be received for content access to be permitted and/or other constraints such as wireless signals which must have been reported before the listed set of wireless signals or a change in wireless signals maybe and sometimes are stored with the content. Thus an owner or user has control over access to content since they can set rules and/or other constraints which must be satisfied to access content they provide.

In some embodiments other entities also have authority to associate content with one or more wireless signals owned by another entity and set rules for content they provide. For example, a manufacturer or distributer, e.g., retailer, of a device which is sold and registered as being owned by someone else may have authority to associate content, e.g., Ebooks with wireless signals transmitted by the listed device and set rules for controlling access to such content. For example, a retailer may provide a book subscription with the sale of a device including a beacon transmitter, such as device 110, allowing for other devices, e.g., cell phones and Ebook readers which receive the beacon signal transmitted by the device, to report receipt of the transmitted beacon signal and access the manufacturer or distributer provided content.

In some embodiments the registered user of a device does not have authority to allow others to access the owner provided content associated with the beacon signal transmitted by the device 108 but can associate content provided by the user with the beacon signal transmitted by the device 108 which others are allowed to access in accordance with user provided rules.

In some embodiments the records shown in FIG. 7 are stored in and used by the server 106 which acts as a network registry device which can map received beacon signals reported to the server 106 to content and provide access to the content either directly or by providing a link or address used access the content. The record 700 may be part of beacon to content mapping information 170 shown in FIG. 1.

Figure 8A:
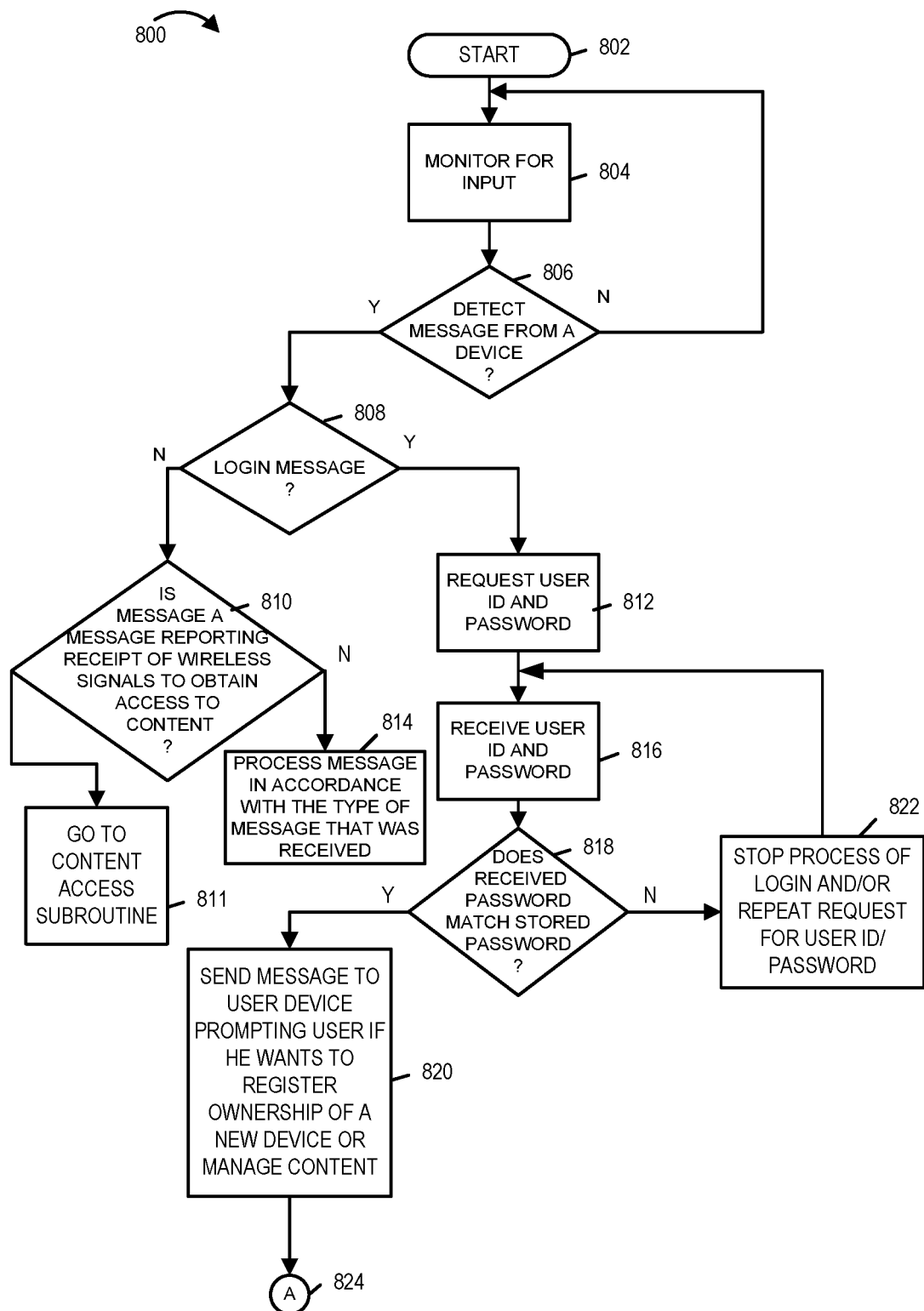
FIG. 8A is a first part of a flow chart showing steps of a method that may implemented by a register node such as the beacon management and/or content server of FIG. 1 to maintain associations between wireless devices, information on which devices are owned and used by particular individuals and/or content management information.
Figure 8B:
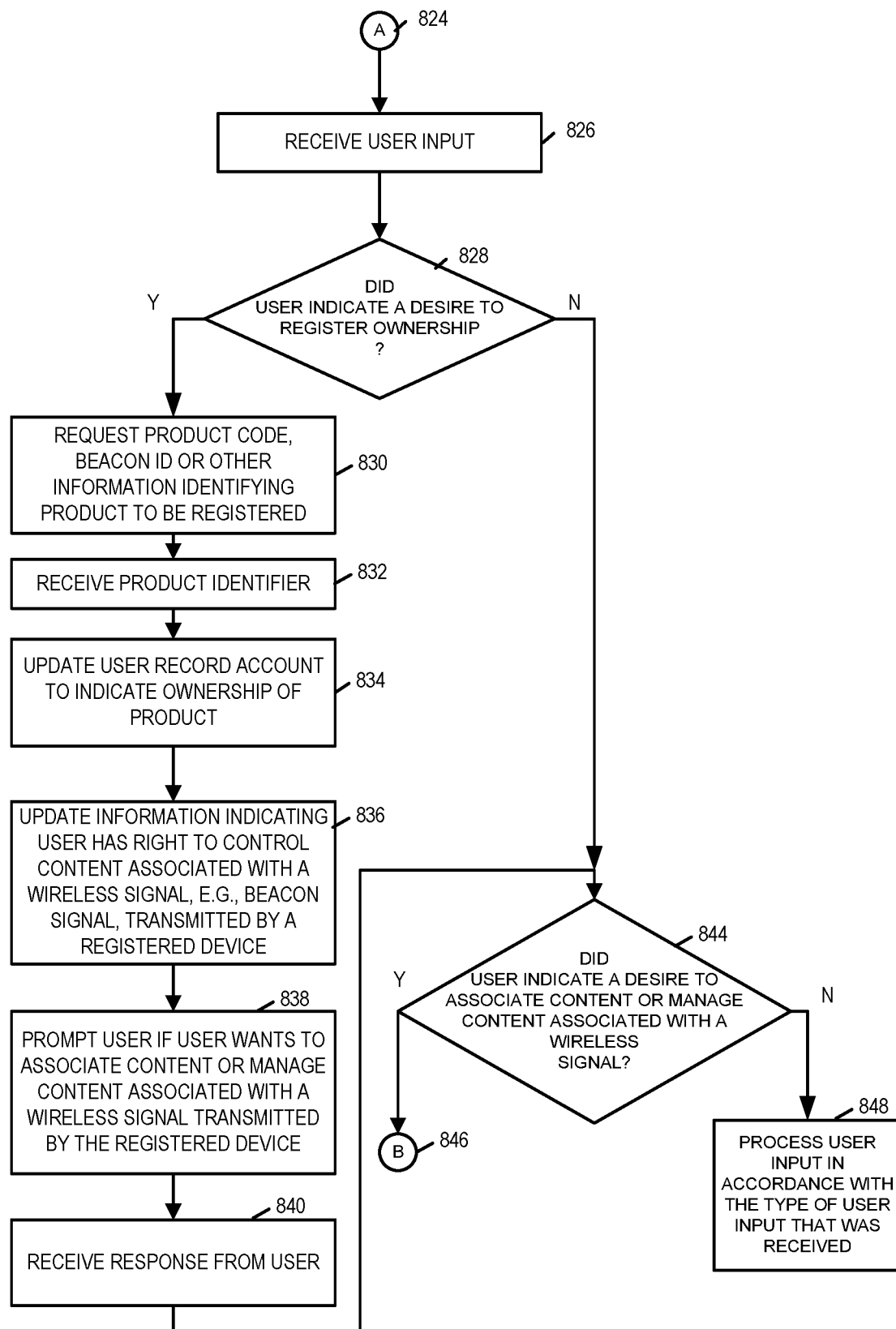
FIG. 8B is a second part of the flow chart shown in FIG. 8A.
Figure 8C:
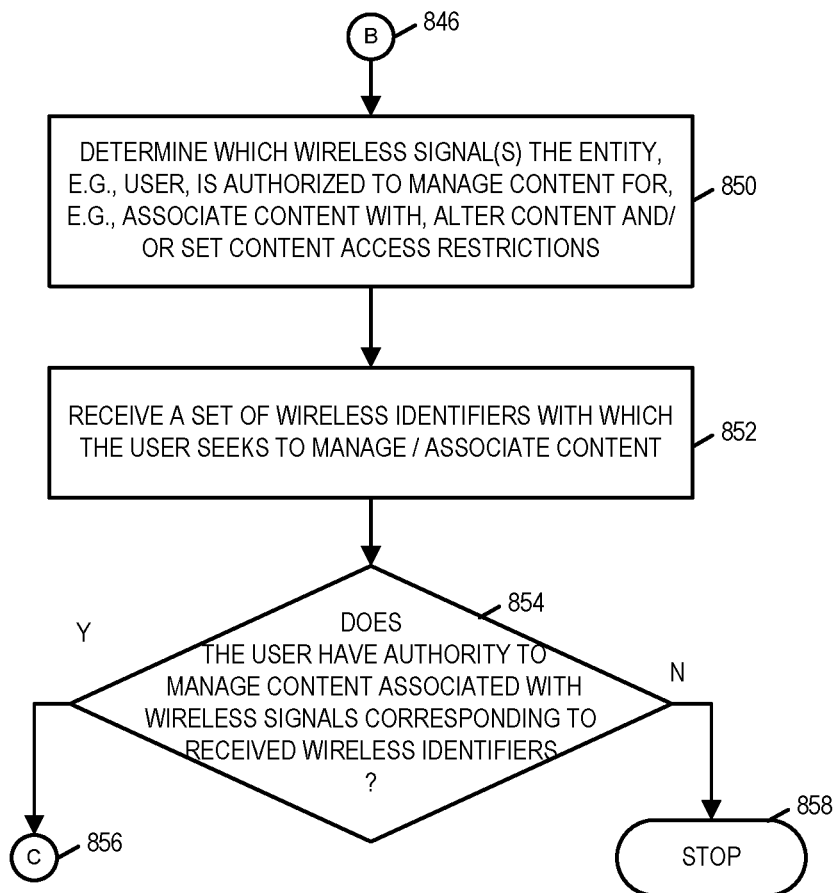
FIG. 8C is a third part of the flow chart shown in FIG. 8A.

FIG. 8, which comprises the combination of FIGS. 8A, 8B, 8C and 8D, shows the steps 800 of a method which may be implemented by the registry device 106. The method allows users to control access to content which they may supply or for which they supply links to. The links, when used to provide access to content, can be used by the device receiving the link to access the content, e.g., on content server 195 which store and can supply content to devices on the Internet 105.

The method starts in step 802, e.g., with the registry device 106 being powered on. Operation proceeds from step 802 to step 804 in which the registry device 106 monitors for input, e.g., messages from user devices and/or entities seeking access to content, seeking to provide content or links to content and/or seeking to set content access restrictions. Thus messages received by the device 106 may be from various entities including users of devices which receive beacon signals, users of the register service which seek to associate content with wireless signals, manufacturers seeking to provide content to devices receiving wireless signals from devices they manufactured and control access to manufacture provided content, owners of devices which transmit beacon signals, etc.

In step 806 a check is made to determine if a message was received from a device. If no message was received operation proceeds again to the monitoring step 804, but if a message was received the message will be processed based on the type of message received. Operation proceeds from step 806 to step 808 when a message is detected as having been received in step 806. In step 808 a check is made to determine if the received message is a LOGIN message in which a user of the register service seeks to login before taking some action.

Figure 10A:
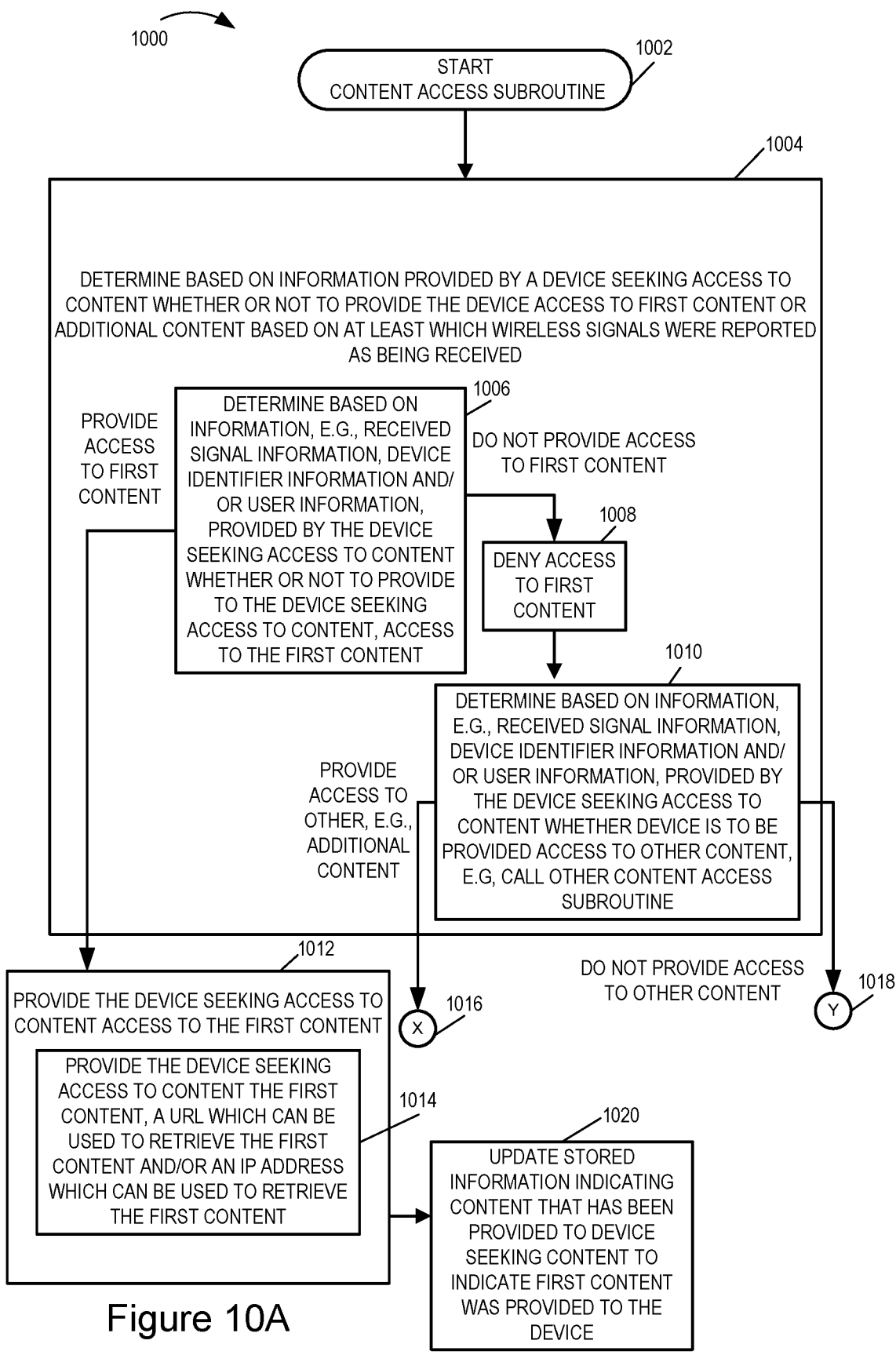
FIG. 10A shows a first part of a content access subroutine and the steps of the subroutine which maybe implemented the steps of a content control subroutine which maybe implemented by a register node such as the beacon management and/or content server of FIG. 1.

If in step 808 it is determined that a login message was not received, e.g., another type of message such as one seeking access to content and reporting the receipt of wireless signals was received, operation proceeds from step 808 to step 810. In step 810 the message is checked to determine if it is a message reporting receipt of wireless signals and seeking access to content. If the received message is not a message reporting the receipt of wireless signals and seeking access to content, operation proceeds from step 810 to step 814 in which the message is then processed in accordance with the type of message that was received. If however in step 810 it is determined that the received message is a message reporting the receipt of wireless signals seeking access to content, a content access subroutine is called in step 811 and operation proceeds to the called subroutine. The routine shown in FIG. 10, which comprises the combination of FIGS. 10A and 10B, is an exemplary content access subroutine which can be called in step 811 and will be discussed further below.

Referring once again to FIG. 8, if it is determined in step 808 that the received message is a login message, operation proceeds to step 812 in which the register device 106 sends a request to the device of the user seeking to login requesting the user to provide a user ID and password. In step 816 the user ID and password is received for processing. Then in step 818 a check is made to determine if the received password matches the password for the identified user which is retrieved from the record in the set of records 700 corresponding to the received user ID. If in step 818 it is determined that the received password does not match the stored password, operation process to step 822 in which the login process is stopped and/or a request for a user ID and password is sent again to the device being used to login. In the case where a repeated request for user ID and password is sent, operation proceeds from step 822 to step 816.

If however, in step 818 it is determined that the received password matches the password of the user identified by the received User ID operation proceeds to step 820 to determine what action the user is seeking to take. In step 820 a message is sent to the user device which logged in to control the device to prompt the user if he wants to register ownership of a new device or manage content. Management of content may involve associating content with a set of one or more wireless signals and/or setting constraints with regard to access to content provided by the user of the register service. Operation proceeds via connecting node A 824 to step 826 shown in FIG. 8B.

In step 826 user input communicated from a user device, e.g., device 121 or 102 is received by registry device 106. Operation then proceeds to step 828 in which a check is made to determine if the user input indicates a desire to register ownership, e.g., of a device which transmits a wireless signal such as a beacon signal having a known beacon ID. The device whose ownership is being registered may be one of the devices 108, 110, 112 or another device capable of transmitting a wireless signal. If in step 828 it is determined that the user has indicated a desire to register ownership of a device, operation proceeds to step 830. In step 830 product code, beacon ID or other information identifying the product to be register is requested. In step 832 a product identifier entered by a user of the register service seeking to register ownership of a device is received. The product identifier may be printed on the packaging of a toy or transmitter device to be registered for easy use or may be a beacon signal ID detected by the device of 121, 102 of the user performing the registration operation. In step 834 the registry device 106 updates information in the set of records 700 indicating the user of the register service registering the device 108, 110 or 112 is the owner of the device and then in step 836 the set of records 700 is updated to indicate that the user registering the device has the right to control content associated with a wireless signal, e.g., beacon signal, transmitted by the registered device. The beacon ID of the signal transmitted by the device may be stored in the set of records 700 as well.

Operation proceeds from step 836 to step 836 in which the registry device 106 sends a message to the user device being used to register ownership prompting the user if the user wants to associate content or manage content associated with the wireless signal transmitted by the device 108, 110, 112 who's ownership was just registered. In step 840 a response is received to the user prompt, and then operation proceeds to step 844.

If in step 828 it was determined that the user did not indicate a desire to register ownership of a device, operation proceeds directly from step 828 to step 844 skipping the ownership registration steps which are included on the path starting with step 830.

In step 844 a determination is made as to whether the user of the device sending the input to the registry device 106 indicated a desire to associate content or manage content associated with a wireless signal. If the answer to the check made in step 844 is no, operation proceeds to step 848 in which the user input is processed in accordance with the type of user input that was received.

If however in step 844 is as determined that the user indicated a desire to associate content or manage content associated with a wireless signal, e.g., a beacon ID, operation proceeds from step 844 to step 850 shown in FIG. 8C via connecting node B 846.

In step 850 a determination is made as to which wireless signal or signals the entity, e.g., user of the register service, is authorized to mange content for, e.g., associate content with, alter content and/or set content access restrictions for. This information is obtained in some embodiments from the set of records 700 and is used to prevent an entity from changing content associated with wireless signals that the entity has not right to associate content with.

Operation proceeds from step 850 to step 852. In step 852 a set of one or more wireless identifiers with which the user seeks to manage and/or associate content is received by the register device 106. Then in step 854 a determination is made as to whether the user has authority to manage content associated with the wireless signal or signal corresponding to the received wireless identifiers. If the user of the register service does not have authority to manage content with regard to the signals corresponding to the wireless identifiers processing of the user's input is stopped in step 858.

If in step 854 it is determined that the user of the register device 106 indicated a desire to associate content or manage content associated with a wireless signal, operation proceeds via connecting node C 856 to step 860 shown in FIG. 8D. In step 860 rules which need to be satisfied and requirements in terms of which signals need to be reported as being received to obtain access to first content are set, e.g., stored, for use in controlling future access to the first content.

In step 860 the register device, which is a network device, is operated to store content access constraint information, e.g., in an entry in the set of records 700. The access constraint information includes one or more of: i) a first set of wireless identifiers including one or more signal identifiers, e.g., beacon IDs, associated with first content and ii) a first set of rules, including one or more rules, for determining when a device seeking access to content is to be provided access to the first content. The first set of rules includes in some but not necessarily all embodiments a rule which depends on the receipt of different wireless signals in different time periods by the device seeking access to content or makes access to the first content dependent on an identify of the device seeking access to the first content or a user of the device seeking access to the first content. For example, the first set of rules may include a rule requiring that a previously received beacon signal was not received for several minutes, day or days after having been received before access to the first content is granted. Alternatively the first set of rules may require that after receipt of a first set of identified beacon signals a second set of beacon signals including a beacon signal not included in the first set is received with the second set of beacon signals being received at least a specified amount of time, e.g., minutes, a day, or days after the first set of beacon signals was received. In addition or alternatively, the first set of rules may include a rule that requires that the device seeking access be one of a list of specified devices which are allowed to access first content and further that a specified set of beacon signals be reported as having been received by the device seeking access. While in many cases the device 121 or 102 seeking access to content has a single user and thus in which case a device identifier can be used as a user identifier, in some cases a device 121 or 102 may be shared in which case content access can be restricted based on receipt of a user identifier in addition to, or in place of, a device identifier of the device 121 or 102 seeking access to content. It should be appreciated messages sent to the register service to obtain services, access content or control content access restrictions normally include a device identifier of the device 102 or 121 seeking access but may also include a user identifier. As part of step 860 the register device 106 may and sometimes does store constraint information which must be satisfied for a device to access other content.

In the case of content access request messages sent from device 121 or 102 seeking access to content normally includes a device identifier, optionally a user identifier, information, e.g., beacon IDs, identifying one or more signals received in a current signal capture time period by the device seeking access to content and optionally information indicating wireless signals received in one or more earlier wireless signal capture time periods. The wireless signal capture information may be in the form of a wireless signal capture record including information for different time periods for minutes, days or weeks with each capture time period in some embodiments corresponding to an interval less then a minute long. In other embodiments each time capture period for which wireless signal capture is reported is several minutes long. The wireless signal capture time periods may be, and sometimes are, of fixed durations, e.g., each capture time period corresponding to a multi-minute period, e.g., a 5 minute or longer wireless signal capture time period.

In some embodiments step 860 includes operation steps 862, 864, 866 which may be performed as part of step 860. In step 862 a determination is made if the entity, e.g., user seeking to set constraints, seeks to set user specific or device specific constraints where a user or device seeking access to content is taken into consideration. Such constraints are useful where access is to be provided to a set of devices in a group but devices outside the group are not to be provided access or are to be provided access to other content. If the user is not seeking to set user specific or device specific access constraints, operation proceeds to step 866 in which the entity seeking to control access to content and/or association of content with one or more wireless signals is provided control over which content is to be supplied to a device reporting receipt of wireless signals irrespective of which device is seeking the content or the user of the device seeking content. In step 866 the entity to which control is provided is allowed to specify a set of wireless signals which must be reported as being received to gain access to particular content and may also specify time dependent constraints such as the requirement that different sets of wireless signals be received in a particular temporal sequence to obtain access to specific content.

In optional step 864 which is performed when in 862 it is determined that the entity controlling access to content wants to set device or user dependent access constrains, the entity is allowed to set constraints which result in different users or devices being provided access to different content, e.g., even when reporting receipt of the same set of wireless signals. The content control subroutine 900 shown in FIG. 9 may be called as part of step 864.

Figure 9:
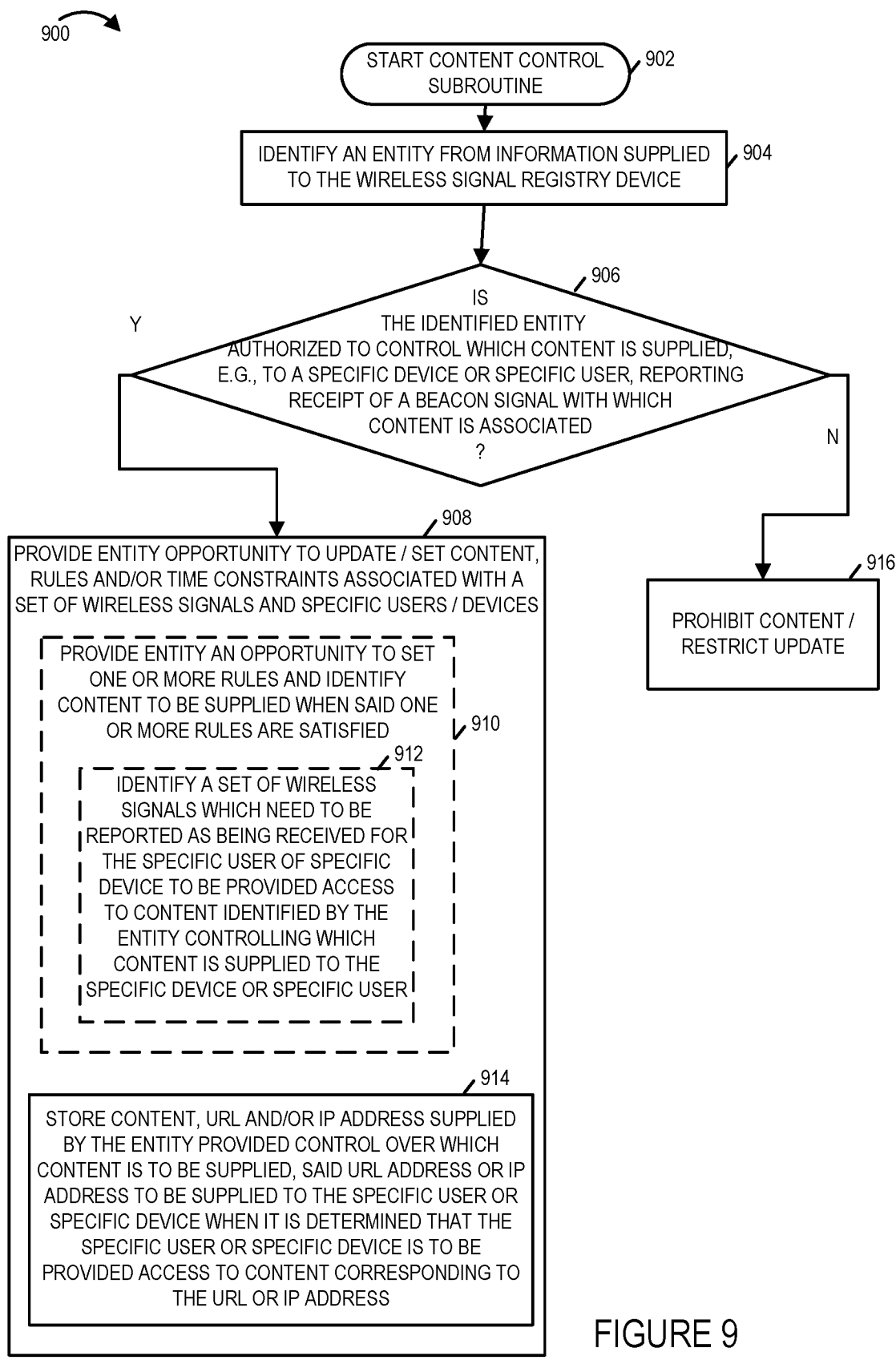
FIG. 9 shows the steps of a content control subroutine which maybe implemented by a register node such as the beacon management and/or content server of FIG. 1.

Content control subroutine 900 shown in FIG. 9 will now be discussed in detail. The content control subroutine which is used to set content access restrictions, change content to be provided and/or associate content with one or more sets of wireless signals will now be described. The method starts in step 902 with operation proceeding to step 904 in which the entity seeking to set or control access is identified from information supplied to the wireless signal registry device 106. Then in step 906 a check is made to determine if the identified entity has authority to control the association and accessing of content corresponding to a set of wireless signals with which content access restrictions and/or content associations are to be made where some of the content restrictions may be dependent on which device or user is seeking access to content.

If the entity seeking to set content restrictions is not authorized to control access to content associated with the wireless signals he is seeking to control associations and/or content access restrictions operation proceeds to step 916 where the entity is prohibited from controlling content access or updating the content associated with one or more wireless signals.

If however in step 906 the entity seeking to control content access is authorized to make such changes and/or set restrictions operation proceeds to step 908. In step 908 the entity seeking to control access to content is provided an opportunity to update and/or associate content with one or more sets of wireless signals and to set access constraints including, in some cases, user or device dependent access constraints.

Step 908 in some embodiments includes step 910. In step 910 the entity seeking to control access to content is provided an opportunity to set one or more rules and identify content to be supplied or provided access to when the one or more rules are satisfied. The rules may include rules which are dependent on a particular device or user requesting access to content with some requesting devices or users being provided access to content not provided to some other devices or users who receive the same wireless signal as the requesting device. Step 912 may be and sometimes is performed as part of step 910. In step 912 a set of wireless signals is identified, e.g., specified, which need to be received for a specific user or device which is also specified to be provided access to the content associated with the specified set of wireless signals. For example the entity can specify a rule that to receive access to content M a device may have to be device J and report receipt of signals BS1 and BS2. The entity may specify that if another device than device J reports receipt of signals BS1 and BS2 the other device is to be provided with other content, e.g., content F.

As part of step 908 content, a URL and/or an IP address supplied by the entity setting the content constraints are stored in step 914 and are associated with the constraints, e.g., rules, used to determine when access is to be provided, e.g., to the supplied content, e.g., in the record 700.

FIG. 10, which comprises the combination of FIGS. 10A and 10B will now be described. FIG. 10 shows the steps 1000 of a content access subroutine which can be used by the registry device 106 to control access to content associated with one or more sets of wireless signals. The subroutine 1000 starts in step 1002, e.g., when called or accessed via step 811 of the method shown in FIG. 8 or from another step.

The routine 1000, which is used to determine what if any access to content should be provided to a device reporting the receipt of wireless signals and seeking access to content starts in step 1002 and proceeds to determination step 1004. In determination step 1004, the registry device 106 determines what if any content access should be provided to the device seeking access to content based on information, e.g., a report of received wireless signals in one or more time periods, a device identify and/or a user identifier, provided by the device 102 or 121 seeking access to content. Step 1004 includes determining based on information provided by the device seeking access to content whether or not to provide the device access to first content or additional content based on at least which wireless signals were reported as being received by the device seeking the access to content.

Step 1004 includes in some embodiments steps 1006, 1008 and 1010. In step 1006 a determination is made based on information, e.g., received signal information, device identifier information and/or user information, provided by the device seeking access to content whether or not to provide access to the first content. For example, in step 1006 a check is made to determine if rules and/or constraints associated with first content are satisfied by the device seeking access to content and if so the device is provided access to the first content but otherwise the decision is made not to provide the device access to the first content. For example if a constraint requires that a particular wireless signal has been received to gain access to the first content and the receipt of such a signal is not reported access to the first content is denied. Or consider a more complicated example where different specific sets of signals need to have been received in different time periods separated by a predetermined amount of time to gain access to the first content and one of the sets of wireless signals was not received or there was not the predetermined amount of time, e.g. a day or more, between the receipt of the sets of signals then access to the first content would be denied.

If in step 1006 the decision is to deny access to provide access to the first content, operation proceeds from step 1006 to step 1012 in which the registry device 106 provides access to the first content. In some embodiments step 1012 includes step 1014. In step 1014 the device seeking access to content is provided access to the first content, e.g., supplied with the first content or provided with a URL or IP address which can be used to access the first content. Operation proceeds from step 1014 to step 1020 wherein the registry device 106 updates stored information indicating what content has been provided to the device seeking access to content. The information is updated to indicate the device was supplied with the first content. This information can be accessed by a constraint, e.g., which may be set so the same content is not provided to the device multiple times.

If however in step 1006 the decision is to not provide access to the first content to the device seeking access, operation proceeds to step 1008 wherein access to the first content is denied and then operation proceeds to step 1010 where a decision is made whether or not to provide access to additional content. Consider for example that while the information received from the device seeking access to content may not have satisfied the rules and/or requirements for providing access to the first content the information may still indicate that the device is to be provided access to some other content. Step 1010 may and in some embodiments does involve a call to the other content access subroutine shown in FIG. 11 which will now be described.

The other content access subroutine includes steps 1100 and starts in step 1102. Operation proceeds from start step 1102 to decision step 1104. In decision step 1104 a decision is made whether or not the information received from the wireless device seeking access to content, e.g., list of received wireless signals, device identifier and/or user identifier satisfies one or more sets of rules or constraints, e.g., stored in record 1700, that would entitle the device to access at least some content. Step 1104 may be part of step 1010 in some embodiments rather than a separate step. If it is determined that the requesting device is not entitled to access content based on the received information, operation proceeds via connecting node Y 1018 to deny access to content step 1030 (see FIG. 10B) and the requesting is denied access to content.

However, if in step 1104 it is determined that the requesting device is entitled to access some content operation proceeds to step 1106. In step 1106 the registry device 106 determines what additional content is to be provided based on one, more or all of: which wireless signals were reported as being received, which device is seeking access to content, what content was previously provided to the device seeking access to content, which one of a plurality of wireless signals which were previously reported as being received is no longer being reported as being received, what new additional signal is reported as being received. Step 1106 may also consider the amount of time between the last time a particular signal was being received and a current received signal report in which the previously received signal is no longer being received.

In some embodiments a time constraint may be specified and considered in step 1106. The time constraint may be a minimum amount of time since a signal was last reported as being received by the device requesting content before access will be provided to a particular piece of content. Where the beacon signals correspond to devices carried by people, the time serves as a minimum amount of time the people are separated from each other before specific content, e.g., content provided by person no longer present will be supplied to the other person.

Once the content to which access is to be provided is determined in step 1106, operation proceeds via connecting node X 1016 to step 1022 of FIG. 10B.

Figure 11:
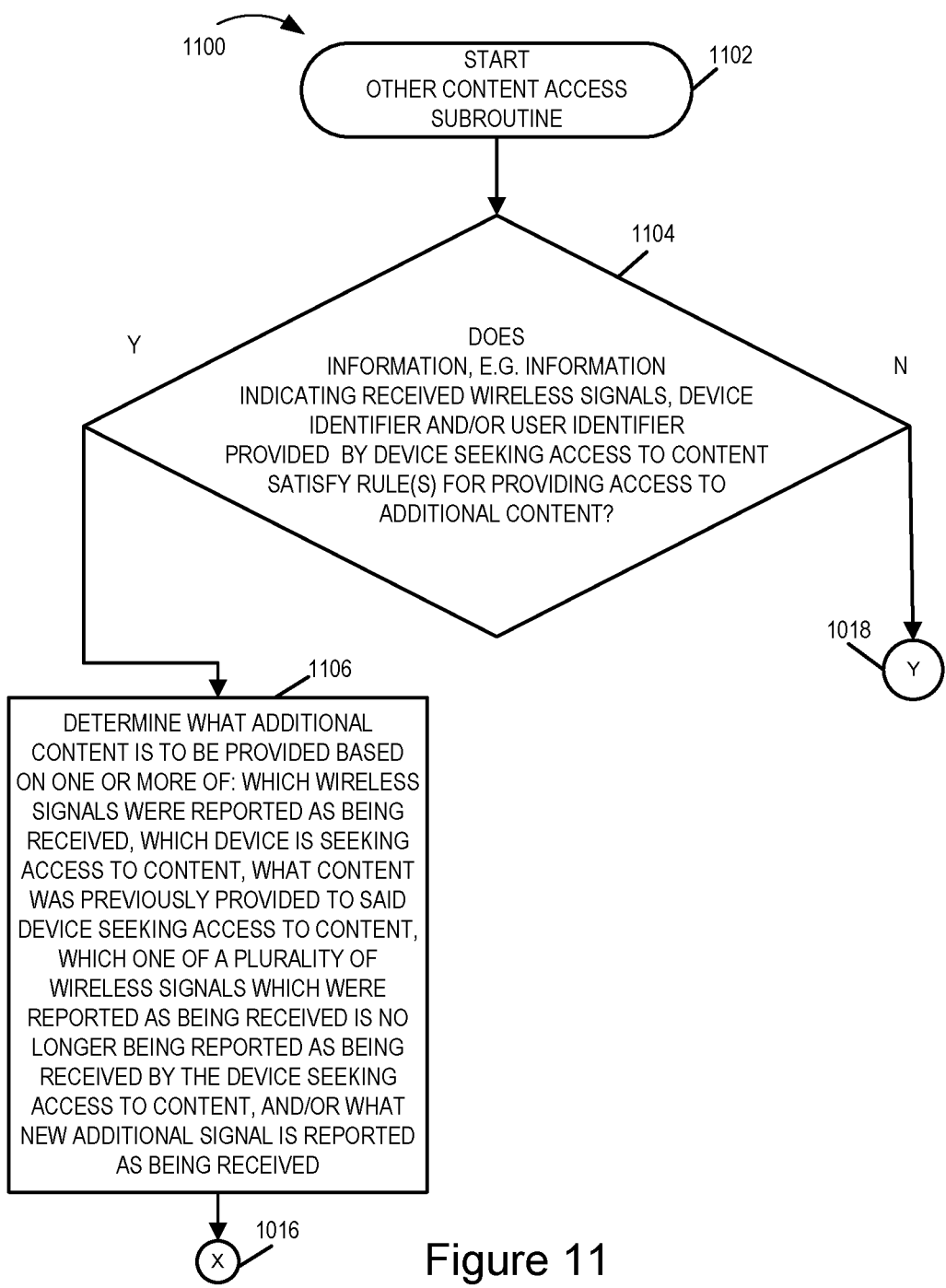

Referring once again to FIG. 10A, if step 1010 did not involve a call to the subroutine of FIG. 11, operation would proceed from step 1010 via connecting node X1016 to step 1022 when it is determined that the registry device 106 is to provide access to other content than the first content, e.g., additional content. If in step 1010 it was determined not to provide access to other content and the subroutine of FIG. 11 was not called, operation proceeds from step 1010 to deny access to content step 1030 via connecting node Y 1018.

In step 1022 the device seeing access to content is provided access to other content, e.g., content other than the first content for which access was denied. Step 1022 in some embodiments involves providing access to the content identified in step 1106 which the requesting device is entitled to access. Step 1022 in some embodiments includes step 1024. In step 1024 the device seeking access to content is provided access to content by the registry device 106 supplying the content which the device is allowed to access or by the registry device 106 supplying a URL or IP address which can be used to access the content which is stored in the content store 196 of the Internet content server 195 which is accessible via the Internet 105 in the FIG. 1 system.

LIST OF EXEMPLARY NUMBERED METHOD EMBODIMENTS

Method embodiment 1. A method of providing access to content, the method comprising:
   storing first content in a storage device;
      operating a network device to store i) a first set of wireless signal identifiers including one or more signal identifiers associated with first content and ii) a first set of rules including one or more rules for determining when a device seeking access to content is to be provided access to said first content, said set of rules including a rule which depends on the receipt of different wireless signals being received in different time periods by the device seeking access to content or makes access to the first content dependent on an identity of the device seeking access to the first content;
   operating the network device to determine, based on information provided by the device seeking access to content, whether or not to provide to the device seeking access to content, access to the first content; and
   when it is determined that access is to be provided to the first content providing the device seeking access to content access to the first content; and
   when it is determined that access is not to be provided to the first content denying access to the first content to the device seeking access to content.

Method embodiment 2. The method of numbered method embodiment) further comprising: updating information in the storage device indicating what content the device seeking access to content has been provided access to.

Method embodiment 3. The method of numbered method embodiment 1, further comprising:
   when it is determined that access is not to be provided to the first content, determining if the device seeking access to content is to be provided access to other content; and
   wherein determining if the device seeking access to content is to be provided access to other content includes:
   determining if the information provided by the device seeking access to content satisfies rules for providing access to additional content; and
   if it is determined that the information provided by the device seeking access to content satisfies rules for providing access to additional content, providing access to at least some of said additional content.

Method embodiment 4. The method of numbered method embodiment 3, further comprising:
   if it is determined that the information provided by the device seeking access to content does not satisfy rules for providing access to additional content, denying the device seeking access to content access to content.

Method embodiment 5. The method of numbered method embodiment 3, further comprising:
   determining which additional content is to be provided based on information indicating which content was previously provided to said device seeking access to content. (e.g., as access to content is provided to a device the server stores information indicating which content was supplied and makes sure the same content is not supplied again, e.g., the next story in a set of stories is supplied or the next image in a stored sequence of images is supplied, the next message from a friend is provided in a sequence determined by the friend providing the content, e.g., messages).

Method embodiment 6. The method of numbered method embodiment 5, wherein determining which additional content is to be provided is further based on which one of a plurality of wireless signals which was reported as being received is no longer being reported as being received.

Method embodiment 7. The method of numbered method embodiment 5, wherein determining which additional content is to be provided is further based on which one of a plurality of wireless signals which was not reported as being received in a previous time period is reported as being received (e.g., a new signal is reported as being received which was not reported as being received in the immediately preceding time period for which received wireless signals were reported) is no longer being reported as being received.

Method embodiment 8. The method of numbered method embodiment 6, wherein determining which additional content is to be provided is further based on a user or device identifier identifying a user or device seeking access to content.

Method embodiment 9. The method of numbered method embodiment 6, further comprising:
   updating information in the storage device indicating what content the device seeking access to content has been provided access to.

Method embodiment 10. The method of numbered method embodiment 1, wherein providing the device seeking access to content access to the first content includes:
   providing the device seeking access to content a URL or IP address which can be used to retrieve said first content (e.g., from a server on the Internet).

Method embodiment 11. The method of numbered method embodiment 3, wherein providing the device seeking access to content access to at least some of the additional content includes:
   providing the device seeking access to content a URL or IP address which can be used to retrieve said at least some of the additional content.

Method embodiment 12. The method of numbered method embodiment 1, further comprising:
   providing an entity control over which content is supplied to a specific device or a specific user in response to the report of one or more wireless signals being received.

Method embodiment 13. The method of numbered method embodiment 12, wherein said network device is a wireless signal registry device, and
   wherein providing an entity control over which content is supplied to a user includes:
   identifying an entity from information supplied to the wireless signal registry device;
   determining from stored authorization information if the identified entity is authorized to control which content is supplied to the specific device or specific user; and
   in response to determining that the entity is authorized to control which content is supplied to the specific device or specific user, providing the entity an opportunity to set one or more rules and identify content to be supplied when said one or more rules are satisfied.

Method embodiment 14. The method of numbered method embodiment 13, wherein setting one or more rules includes identifying a set of wireless signals which need to be reported as being received for the specific user or specific device to be provided access to content identified by the entity controlling which content is supplied to the specific device or specific user.

Method embodiment 15. The method of numbered method embodiment 14, further comprising:
storing a URL or IP address supplied by the entity provided control over which content is to be supplied, said URL or IP address to be supplied to the specific user or specific device when it is determined that the specific user or specific device is to be provided access to content corresponding to said URL or IP address.

Method embodiment 16. The method of numbered method embodiment 15, wherein said entity is one or a manufacturer, user or owner of said specific device.

LIST OF EXEMPLARY NUMBERED SYSTEM EMBODIMENTS

System embodiment 1. A system for providing access to content, the system comprising:
a first storage device including first content;
a network device including a processor configured to:
store: in said first storage device or another storage device (e.g., internal memory) i) a first set of wireless signal identifiers including one or more signal identifiers associated with first content and ii) a first set of rules including one or more rules for determining when a device seeking access to content is to be provided access to said first content, said set of rules including a rule which depends on the receipt of different wireless signals being received in different time periods by the device seeking access to content or makes access to the first content dependent on an identity of the device seeking access to the first content;
determine, based on information provided by the device seeking access to content, whether or not to provide to the device seeking access to content, access to the first content; and
provide the device seeking access to content access to the first content, when it is determined that access is to be provided to the first content; and deny access to the first content to the device seeking access to content, when it is determined that access is not to be provided to the first content.

System embodiment 2. The system of system embodiment 1 wherein said processor is further configured to:
update information in said first storage device or said another storage device indicating what content the device seeking access to content has been provided access to.

System embodiment 3. The system of system embodiment 1, wherein said processor is further configured to:
determine if the device seeking access to content is to be provided access to other content, when it is determined that access is not to be provided to the first content;
determine if the information provided by the device seeking access to content satisfies rules for providing access to additional content, as part of being configured to determine if the device seeking access to content is to be provided access to other content; and
provide access to at least some of said additional content, if it is determined that the information provided by the device seeking access to content satisfies rules for providing access to additional content.

System embodiment 4. The system of system embodiment 3, wherein said processor is further configured to:
deny the device seeking access to content access to content, if it is determined that the information provided by the device seeking access to content does not satisfy rules for providing access to additional content.

System embodiment 5. The system of system embodiment 3, wherein said processor is further configured to:
determine which additional content is to be provided based on information indicating which content was previously provided to said device seeking access to content. (e.g., as access to content is provided to a device the server stores information indicating which content was supplied and makes sure the same content is not supplied again, e.g., the next story in a set of stories is supplied or the next image in a stored sequence of images is supplied, the next message from a friend is provided in a sequence determined by the friend providing the content, e.g., messages).

System embodiment 6. The system of system embodiment 5, wherein said processor is further configured to:
base the determination of which additional content is to be provided on which one of a plurality of wireless signals which was reported as being received is no longer being reported as being received.

System embodiment 7. The system of system embodiment 5, wherein said processor is further configured to:
base the determination of which additional content is to be provided on which one of a plurality of wireless signals which was not reported as being received in a previous time period is reported as being received (e.g., a new signal is reported as being received which was not reported as being received in the immediately preceding time period for which received wireless signals were reported) is no longer being reported as being received.

System embodiment 8. The system of system embodiment 6, wherein said processor is further configured to;
base the determination of which additional content is to be provided on a user or device identifier identifying a user or device seeking access to content.

System embodiment 9. The system of system embodiment 6, wherein said processor is further configured to:
update information in the first storage device or said another storage device indicating what content the device seeking access to content has been provided access to.

System embodiment 10. The system of system embodiment 1, wherein said processor is further configured to:
provide the device seeking access to content a URL or IP address which can be used to retrieve said first content (e.g., from a server on the Internet), as part of being configured to provide the device seeking access to content access to the first content.

System embodiment 11. The system of system embodiment 3, wherein said processor is further configured to:
provide the device seeking access to content a URL or IP address which can be used to retrieve said at least some of the additional content, as part of providing the device seeking access to content access to at least some of the additional content.

System embodiment 12. The system of system embodiment 1, wherein said processor is further configured to:
provide an entity control over which content is supplied to a specific device or a specific user in response to the report of one or more wireless signals being received.

System embodiment 13. The system of system embodiment 12, wherein said network device is a wireless signal registry device, and wherein said processor is further configured to:
identify an entity from information supplied to the wireless signal registry device;

determine from stored authorization information if the identified entity is authorized to control which content is supplied to the specific device or specific user; and provide the entity an opportunity to set one or more rules and identify content to be supplied when said one or more rules are satisfied, in response to determining that the entity is authorized to control which content is supplied to the specific device or specific user, as part of being configured to provide an entity control over which content is supplied to a user.

System embodiment 14. The system of system embodiment 13, wherein said processor is further configured to:

identify a set of wireless signals which need to be reported as being received for the specific user or specific device to be provided access to content identified by the entity controlling which content is supplied to the specific device or specific user, as part of being configured to set one or more rules.

System embodiment 15. The system of system embodiment 14, wherein said processor is further configured to:

store a URL or IP address supplied by the entity provided control over which content is to be supplied, said URL or IP address to be supplied to the specific user or specific device, when it is determined that the specific user or specific device is to be provided access to content corresponding to said URL or IP address.

System embodiment 16. The system of system embodiment 15, wherein said entity is one or a manufacturer, user or owner of said specific device.

The methods and apparatus of the present invention are applicable to a wide range of communications systems which transmit signals, e.g., beacons signals including WiFi, Bluetooth, cellular and/or non-cellular systems.

In various embodiments nodes described herein are implemented using one or more modules to perform the steps corresponding to one or more methods of the present invention, for example, signal reception, signal processing, a determinations, message generation and/or transmission steps. Thus, in some embodiments various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware, to perform one or more of the steps of the above-described method(s)

Numerous additional variations on the methods and apparatus of the present invention described above will be apparent to those skilled in the art in view of the above description of the invention. Such variations are to be considered within the scope of the invention. The methods and apparatus of the present invention may be, and in various embodiments are, used with CDMA, orthogonal frequency division multiplexing (OFDM), and/or various other types of communications techniques which may be used to provide wireless communications links between access nodes and mobile nodes and/or between beacon transmitters and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of the present invention Some embodiments are directed a non-transitory computer readable medium embodying a set of software instructions, e.g., computer executable instructions, for controlling a computer or other device to communicate information.

The techniques of various embodiments may be implemented using software, hardware and/or a combination of software and hardware. Various embodiments are directed to apparatus, e.g., a server such as an emergency management server. Various embodiments are also directed to methods, e.g., a method of providing emergency related information. Various embodiments are also directed to a non-transitory machine, e.g., computer, readable medium, e.g., ROM, RAM, CDs, hard discs, etc., which include machine readable instructions for controlling a machine to implement one or more steps of a method.

As discussed above various features of the present invention are implemented using modules. Such modules may, and in some embodiments are, implemented as software modules. In other embodiments the modules are implemented in hardware. In still other embodiments the modules are implemented using a combination of software and hardware. In some embodiments the modules are implemented as individual circuits with each module being implemented as a circuit for performing the function to which the module corresponds. A wide variety of embodiments are contemplated including some embodiments where different modules are implemented differently, e.g., some in hardware, some in software, and some using a combination of hardware and software. It should also be noted that routines and/or subroutines, or some of the steps performed by such routines, may be implemented in dedicated hardware as opposed to software executed on a general purpose processor. Such embodiments remain within the scope of the present invention. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods. Accordingly, among other things, the present invention is directed to a machine-readable medium including machine executable instructions for causing a machine, e.g., processor and associated hardware, to perform one or more of the steps of the above-described method(s).

The techniques of the present invention may be implemented using software, hardware and/or a combination of software and hardware. The present invention is directed to apparatus, e.g., a server, a beacon transmitter, mobile nodes such as mobile terminals, non-management user devices, management person user devices, base stations, and a communications system which implement the present invention. It is also directed to methods, e.g., method of controlling and/or operating a server, a beacon transmitters, mobile nodes including user devices, base stations and/or communications systems, e.g., hosts, in accordance with the present invention. The present invention is also directed to machine readable medium, e.g., ROM, RAM, CDs, hard discs, etc., which include machine readable instructions for controlling a machine to implement one or more steps in accordance with the present invention.

Numerous additional variations on the methods and apparatus of the various embodiments described above will be apparent to those skilled in the art in view of the above description. Such variations are to be considered within the scope.

What is claimed is:

1. A method of providing access to content, the method comprising:
   storing content in a storage device, the content including a first content;
   operating a network device to store a first rule for determining when a device seeking access to content is to be provided access to said first content, said first rule requiring the receipt of different sets of wireless signals, in different time periods by the device seeking access to content for the first rule to be satisfied, said different sets of wireless signals including a first set of wireless signals and a second set of wireless signals, said first set of wireless signals including a different number of wireless signals than said second set of wireless signals, at least one of said first and second sets of wireless signals including a first signal indicating a first wireless signal identifier and a second signal indicating a second wireless signal identifier, said second wireless signal identifier being different from said first wireless signal identifier;
   operating the network device to receive, from the device seeking access to content, information indicating at least one wireless signal identifier received in a wireless signal by the device seeking access to content;
   operating the network device to determine, based on said first rule and information including the at least one wireless signal identifier received by the device seeking access to content, whether or not to provide the device, access to the first content, said network device determining to provide the first content when the network device determines that the first rule has been satisfied;
   when it is determined that access is to be provided to the first content, providing the device access to the first content; and
   when it is determined that access is not to be provided to the first content denying access to the first content to the device seeking access to content.

2. The method of claim 1, further comprising:
   when it is determined that access is not to be provided to the first content, determining if the information provided by the device seeking access to content satisfies a rule for providing access to additional content; and
   if it is determined that the information provided by the device seeking access to content satisfies a rule for providing access to additional content, providing access to at least some of said additional content.

3. The method of claim 2, further comprising:
   determining which additional content is to be provided based on information indicating which content was previously provided to said device seeking access to content.

4. The method of claim 2,
   wherein the first signal indicating the first wireless signal identifier and the second signal indicating the second wireless signal identifier are reported as being received during a first time period;
   wherein the second signal indicating the second wireless signal identifier is not reported as being received during a second time period; and
   wherein determining which additional content is to be provided is further based on which one of the first and second signals which was previously reported as being received is no longer being reported as being received.

5. The method of claim 3, wherein determining which additional content is to be provided is further based on which one of a plurality of wireless signals which was not reported as being received during a first time period is reported as being received in a second time period, said first time period being a time period which precedes said second time period.

6. The method of claim 4, wherein determining which additional content is to be provided is further based on a user or device identifier identifying a user or device seeking access to content.

7. The method of claim 3, further compromising:
   updating information in the storage device indicating what content the device seeking access to content has been provided access to.

8. The method of claim 1, wherein the first rule requires that the device seeking access to the first content report receipt of a beacon signal corresponding to a first device to the network device after reporting the receipt of a beacon signal corresponding to the first device and a beacon signal corresponding to a second device.

9. The method of claim 2, wherein providing the device seeking access to content access to at least some of the additional content includes:
   providing the device seeking access to content a URL or IP address which can be used to retrieve said at least some of the additional content.

10. The method of claim 1, further comprising:
    providing an entity control over which content is supplied to a specific device or a specific user in response to a report of one or more wireless signals being received.

11. The method of claim 10, wherein said network device is a wireless signal registry device, and
    wherein providing an entity control over which content is supplied to a specific device or a specific user includes:
      identifying an entity from information supplied to the wireless signal registry device;
      determining from stored authorization information if the identified entity is authorized to control which content is supplied to the specific device or the specific user; and
      in response to determining that the entity is authorized to control which content is supplied to the specific device or the specific user, providing the entity an opportunity to set one or more rules and identify content to be supplied when said one or more rules are satisfied.

12. The method of claim 11, wherein setting one or more rules includes identifying a set of wireless signals which need to be reported as being received for the specific user or the specific device to be provided access to content identified by the entity controlling which content is supplied to the specific device or the specific user.

13. The method of claim 12, further comprising:
    storing a URL or IP address supplied by the entity which was provided control over which content is to be supplied, said URL or IP address to be supplied to the specific user or the specific device when it is determined that the specific user or specific device is to be provided access to content corresponding to said URL or IP address.

14. A system for providing access to content, the system comprising:
    a storage device including content, the content including a first content;

a network device including a processor configured to:
store the content in the storage device; store a first rule for determining when a device seeking access to content is to be provided access to said first content, said first rule requiring the receipt of different sets of wireless signals in different time periods by the device seeking access to content for the first rule to be satisfied, said different sets of wireless signals including a first set of wireless signals and a second set of wireless signals, said first set of wireless signals including a different number of wireless signals than said second set of wireless signals, at least one of said first and second sets of wireless signals including a first signal indicating a first wireless signal identifier and a second signal indicating a second wireless signal identifier, said second wireless signal identifier being different from said first wireless signal identifier;
receive, from the device seeking access to content, information indicating at least one wireless signal identifier received in a wireless signal by the device seeking access to content;
determine, based on said first rule and information including the at least one wireless signal identifier received by the device seeking access to content, whether or not to provide the device access to the first content, said network device determining to provide the first content when the network device determines that the first rule has been satisfied;
provide, when it is determined that access is to be provided to the first content, the device access to the first content; and
deny, when it is determined that access is not to be provided to the first content, access to the first content to the device seeking access to content.

15. The system of claim 14, wherein said processor is further configured to:
determine if the device seeking access to content is to be provided access to additional content when it is determined that access is not to be provided to the first content; and
provide access to at least some of said additional content, if it is determined that the information provided by the device seeking access to content satisfies a rule for providing access to additional content.

16. The system of claim 15, wherein said processor is further configured to:
deny the device seeking access to content access to additional content, if it is determined that the information provided by the device seeking access to content does not satisfy the rule for providing access to additional content.

17. The system of claim 15, wherein said processor is further configured to:
determine which additional content is to be provided based on information indicating which content was previously provided to said device seeking access to content.

18. The system of claim 14, wherein said processor is further configured to:
provide the device seeking access to content a URL or IP address which can be used to retrieve said first content, as part of being configured to provide the device seeking access to content access to the first content.

19. The system of claim 14, wherein said processor is further configured to:
provide an entity control over which content is supplied to a specific device or a specific user in response to a report of one or more wireless signals being received.

20. A non-transitory computer readable medium including computer executable instructions which when executed by a computer of a network node control said network node to:
store content in a storage device, the content including a first content;
store a first rule for determining when a device seeking access to content is to be provided access to said first content, said first rule requiring the receipt of different sets of wireless signals in different time periods by the device seeking access to content for the first rule to be satisfied, said different sets of wireless signals including a first set of wireless signals and a second set of wireless signals, said first set of wireless signals including a different number of wireless signals than said second set of wireless signals, at least one of said first and second sets of wireless signals including a first signal indicating a first wireless signal identifier and a second signal indicating a second wireless signal identifier, said second wireless signal identifier being different from said first wireless signal identifier;
receive, from the device seeking access to content, information indicating at least one wireless signal identifier received in a wireless signal by the device seeking access to content;
determine, based on said first rule and information including the at least one wireless signal identifier received by the device seeking access to content, whether or not to provide the device access to the first content, said network device determining to provide the first content when the network device determines that the first rule has been satisfied;
provide, when it is determined that access is to be provided to the first content, the device access to the first content; and
deny, when it is determined that access is not to be provided to the first content, access to the first content to the device seeking access to content.

* * * * *